United States Patent
Lawson et al.

(10) Patent No.: US 9,568,909 B2
(45) Date of Patent: *Feb. 14, 2017

(54) INDUSTRIAL AUTOMATION SERVICE TEMPLATES FOR PROVISIONING OF CLOUD SERVICES

(71) Applicant: Rockwell Automation Technologies, Inc., Mayfield Heights, OH (US)

(72) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,475

(22) Filed: Jul. 31, 2015

(65) Prior Publication Data
US 2015/0341469 A1 Nov. 26, 2015

Related U.S. Application Data

(63) Continuation of application No. 13/725,578, filed on Dec. 21, 2012, now Pat. No. 9,128,472.
(Continued)

(51) Int. Cl.
G06F 17/30 (2006.01)
G05B 19/418 (2006.01)
(Continued)

(52) U.S. Cl.
CPC .......... *G05B 19/4185* (2013.01); *G05B 11/01* (2013.01); *G06F 1/12* (2013.01); *G06F 1/14* (2013.01);
(Continued)

(58) Field of Classification Search
USPC .................................................. 707/779, 803
See application file for complete search history.

(56) References Cited

U.S. PATENT DOCUMENTS 5,014,317 A   5/1991   Kita et al.
5,122,948 A   6/1992   Zapolin
(Continued)

FOREIGN PATENT DOCUMENTS

CN   101114160   1/2008
CN   101536002   9/2009
(Continued)

OTHER PUBLICATIONS

Chinese Office Action for Chinese Application No. 201410196775.0 dated May 5, 2016, 14 pages.
(Continued)

*Primary Examiner* — Cam-Linh Nguyen
(74) *Attorney, Agent, or Firm* — Amin, Turocy & Watson, LLP

(57) ABSTRACT

A library of cloud templates for configuring cloud-based industrial solutions is provided. A cloud template provisioning system provides a platform for location and retrieval of a variety of cloud templates that facilitate configuration of cloud-based industrial applications, including control panel templates, dashboard templates, data historian templates, virtual machine management templates, and other such templates. The cloud templates can be installed and executed on a client device to provide an intuitive interface for configuring various aspects of the cloud-based solution.

20 Claims, 20 Drawing Sheets

Related U.S. Application Data

(60) Provisional application No. 61/587,531, filed on Feb. 9, 2012.

(51) Int. Cl.

| | | |
|---|---|---|
| *G05B 11/01* | (2006.01) | |
| *H04L 29/06* | (2006.01) | |
| *H04L 29/08* | (2006.01) | |
| *G06F 1/12* | (2006.01) | |
| *G06F 1/14* | (2006.01) | |
| *G06F 9/50* | (2006.01) | |

(52) U.S. Cl.

CPC ....... *G06F 9/5072* (2013.01); *G06F 17/30233* (2013.01); *G06F 17/30545* (2013.01); *G06F 17/30554* (2013.01); *G06F 17/30867* (2013.01); *H04L 67/10* (2013.01); *H04L 67/16* (2013.01); *H04L 67/42* (2013.01); *G05B 2219/31326* (2013.01); *G05B 2219/31334* (2013.01); *G05B 2219/33139* (2013.01); *Y02P 80/114* (2015.11); *Y02P 90/16* (2015.11); *Y02P 90/18* (2015.11); *Y02P 90/185* (2015.11)

(56) References Cited

U.S. PATENT DOCUMENTS

| | | |
|---|---|---|
| 5,199,009 A | 3/1993 | Svast |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,978,568 A | 11/1999 | Abraham et al. |
| 6,167,337 A | 12/2000 | Haack |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,535,926 B1 | 3/2003 | Esker |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,708,074 B1 | 3/2004 | Chi et al. |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,774,598 B1 | 8/2004 | Kohler |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 8,150,959 B1 | 4/2012 | Bezdicek et al. |
| 8,266,066 B1 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 9,024,955 B2 | 5/2015 | Ramarao et al. |
| 9,438,648 B2 | 9/2016 | Asenjo et al. |
| 2002/0004798 A1 | 1/2002 | Babula et al. |
| 2002/0016839 A1 | 2/2002 | Smith |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0073236 A1 | 6/2002 | Helgeson et al. |
| 2002/0077711 A1 | 6/2002 | Nixon et al. |
| 2002/0094588 A1 | 7/2002 | Fan et al. |
| 2002/0107904 A1 | 8/2002 | Talluri et al. |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0038528 A1 | 2/2005 | McKelvey et al. |
| 2005/0055429 A1 | 3/2005 | Abele et al. |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |

(56) References Cited

U.S. PATENT DOCUMENTS

| | | |
|---|---|---|
| 2005/0209902 A1 | 9/2005 | Iwasaki et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0253205 A1 | 11/2006 | Gardiner |
| 2007/0008129 A1 | 1/2007 | Soliman |
| 2007/0019641 A1 | 1/2007 | Pai et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0118560 A1 | 5/2007 | Bornhoevd et al. |
| 2007/0192213 A1 | 8/2007 | Wu et al. |
| 2007/0194097 A1 | 8/2007 | Jones |
| 2007/0247789 A1 | 10/2007 | Benson et al. |
| 2008/0027704 A1 | 1/2008 | Kephart et al. |
| 2008/0125887 A1 | 5/2008 | Case |
| 2008/0155064 A1 | 6/2008 | Kosuge |
| 2008/0189637 A1 | 8/2008 | Krajewski et al. |
| 2008/0208365 A1 | 8/2008 | Grgic et al. |
| 2008/0263514 A1 | 10/2008 | DeMesa |
| 2009/0063258 A1 | 3/2009 | Mueller et al. |
| 2009/0086692 A1 | 4/2009 | Chen |
| 2009/0088875 A1 | 4/2009 | Baier et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2010/0076575 A1 | 3/2010 | Vasko et al. |
| 2010/0082129 A1 | 4/2010 | McGreevy et al. |
| 2010/0082453 A1 | 4/2010 | Speers et al. |
| 2010/0083232 A1 | 4/2010 | Chouinard et al. |
| 2010/0118895 A1 | 5/2010 | Radulescu |
| 2010/0153487 A1 | 6/2010 | Greven et al. |
| 2010/0192144 A1 | 7/2010 | Schmit |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0276498 A1 | 11/2011 | Madhok |
| 2012/0054246 A1 | 3/2012 | Fischer |
| 2012/0072597 A1 | 3/2012 | Teather et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0147894 A1 | 6/2012 | Mulligan et al. |
| 2012/0232876 A1 | 9/2012 | Misra |
| 2012/0262069 A1 | 10/2012 | Reed |
| 2012/0290104 A1 | 11/2012 | Holt et al. |
| 2012/0304007 A1 | 11/2012 | Hanks et al. |
| 2012/0306620 A1 | 12/2012 | Karaffa et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211547 A1 | 8/2013 | Buchdunger et al. |
| 2013/0212420 A1 | 8/2013 | Lawson et al. |
| 2013/0257627 A1 | 10/2013 | Rafael |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2014/0046977 A1 | 2/2014 | Gopalakrishnan et al. |
| 2014/0047107 A1 | 2/2014 | Maturana et al. |
| 2014/0095654 A1 | 4/2014 | Finnerty et al. |
| 2014/0137257 A1 | 5/2014 | Martinez et al. |
| 2014/0156032 A1 | 6/2014 | Jenkins et al. |
| 2014/0156584 A1 | 6/2014 | Motukuri |
| 2014/0279641 A1 | 9/2014 | Singh et al. |
| 2014/0279948 A1 | 9/2014 | Mahate et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336795 A1 | 11/2014 | Asenjo et al. |
| 2014/0337000 A1 | 11/2014 | Asenjo et al. |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0304193 A1 | 10/2015 | Ishii et al. |
| 2015/0378356 A1 | 12/2015 | Hefeeda et al. |

FOREIGN PATENT DOCUMENTS

| | | |
|---|---|---|
| CN | 101739007 | 6/2010 |
| CN | 102449567 A | 5/2012 |
| CN | 102927937 | 2/2013 |
| DE | 19834456 | 2/2000 |
| EP | 1209558 A2 | 5/1996 |
| EP | 1531373 | 5/2005 |
| EP | 1686442 | 8/2006 |
| EP | 1933214 | 6/2008 |
| EP | 2189900 | 5/2010 |
| EP | 2293164 | 3/2011 |
| EP | 2453326 | 5/2012 |
| EP | 2469466 A1 | 6/2012 |
| EP | 2801938 | 11/2014 |
| EP | 2801940 | 11/2014 |
| EP | 2801941 | 11/2014 |
| WO | 0111586 | 2/2001 |
| WO | 0169329 | 9/2001 |
| WO | 0217131 | 2/2002 |
| WO | 03058506 | 7/2003 |
| WO | 2008133715 | 11/2008 |
| WO | 2009046095 | 4/2009 |
| WO | 2011050482 | 5/2011 |
| WO | 2013007866 | 1/2013 |

OTHER PUBLICATIONS

Dhinese Office Action for Chinese Application No. 201410198289.2 dated Apr. 5, 2016, 18 pages.

Dhinese Office Action for Chinese Application No. 201410196905.0 dated Apr. 5, 2016, 20 pages.

Chinese Office Action for Chinese Application No. 201410196127.5 dated Apr. 7, 2016, 13 pages.

Dhinese Office Action for Chinese Application No. 201410196114.8 dated Apr. 25, 2016, 20pages.

Chinese Office Action for Chinese Application No. 201410196525.7, dated May 5, 2016, 13 pages.

European Search Report dated Aug. 11, 2014 for European Application No. 14167714.6-1955, 5 pages.

European Search Report dated Aug. 11, 2014 for European Application No. 14167706.2-1955, 7 pages.

European Search Report dated Aug. 11, 2014 for European Application No. 14167626.2-1955, 9 pages.

European Search Report dated Aug. 11, 2014 for European Application No. 14167627.0-1955, 6 pages.

(56) References Cited

OTHER PUBLICATIONS

European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4, 2001, XML.com, http://webservices.xml.com/pub/a/ws/2001/04/04/webservices/index.html.
Office Action dated Mar. 6, 2006 for U.S. Appl. No. 10/162,315, 8 pages.
W3C, Web Services Description Language, http://www.w3.org/TR/wsd1, Mar. 15, 2001, 36 pages.
European Search Report dated Mar. 18, 2004 for European Patent Application Serial No. 03026339, 3 Pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Office Action dated Jun. 18, 2014 for U.S. Appl. No. 13/725,578, 13 pages.
Office Action dated Aug. 19, 2014 for U.S. Appl. No. 13/615,195, 22 pages.
Office Action dated Oct. 9, 2014 for U.S. Appl. No. 13/725,543, 10 pgs.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Office Action for U.S. Appl. No. 13/725,660 dated Aug. 18, 2015, 90 pgs.
A.W. Colombo, S Karnouskos, and J. M. Mendes, "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Amando Walter Colombo and Stamatis Krnouskos, "Towards the Factory of the Future: A Service-Oriented Cross-layer Infrastructure," ICT Shaping the World: A Scientific View, 2009, pp. 65-81.
Notice of Allowance for U.S. Appl. No. 13/725,578, dated Apr. 24, 2015, 23 pages.
Chinese Office Action for Chinese Application Serial No. 201410195780.X, dated May 26, 2016, 16 pages (including translation).
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for European Patent Application Serial No. 16160604.1, dated Aug. 17, 2016, 9 pages.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Office Action dated Sep. 22, 2015 for European Application No. 14167707.0-1955, 9 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
"Recursion Software, ""SCADA-Aware Mobile""", Frisco, TX, Aug. 29, 2012 (accessed from<<http://www.emsenergyautomation.com/brochures/scada.pdf>> on Feb. 11, 2016)".
"Ars Technica, ""Windows 7 themes: how to unlock them or create your own""", Nov. 12, 2009 (accessed from<<http://arstechnica.com/information-technology/2009/11/unlock-hidden-windows-7-themesl on Mar. 8, 2016>>)".
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth= 1).

(56) References Cited

OTHER PUBLICATIONS

Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Appication Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Dell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.

INDUSTRIAL AUTOMATION SERVICE TEMPLATES FOR PROVISIONING OF CLOUD SERVICES

RELATED APPLICATIONS

This application is a continuation of, and claims priority to, U.S. patent application Ser. No. 13/725,578, filed on Dec. 21, 2012, and entitled "INDUSTRIAL AUTOMATION SERVICE TEMPLATES FOR PROVISIONING OF CLOUD SERVICES," which claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS." This application is also related to U.S. patent application Ser. No. 10/162,315, filed on Jun. 4, 2002 (which issued as U.S. Pat. No. 7,151,966 on Dec. 19, 2006), and entitled "SYSTEM AND METHODOLOGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to the use of templates to implement cloud-based solutions for industrial automation systems.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to the use of cloud templates that allow industrial devices and other client devices to quickly and easily implement cloud-based solutions for industrial automation. To this end, a suite of pre-verified cloud templates are provided that can be incorporated in a variety of devices, including but not limited to industrial controllers, I/O devices, motors and motor drives, pumps, business servers, data historians, personal client devices, and other such equipment. Some cloud templates can implement cloud-capability in the hosting device, providing the device with the means to communicatively couple to and exchange data with cloud-based services residing on a cloud platform. Other templates can be configured to render administrative control panels that allow authorized users to control various aspects of a cloud-based solution (e.g., resource allocation, billing, user management, device management, etc.), or to render dashboards that provide views of selected portions of a cloud-based industrial solution. Virtual machine management templates are also provided that facilitate creation, deployment, and control of cloud-based virtual machines used to monitor or control portions of an automation system via a cloud platform.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
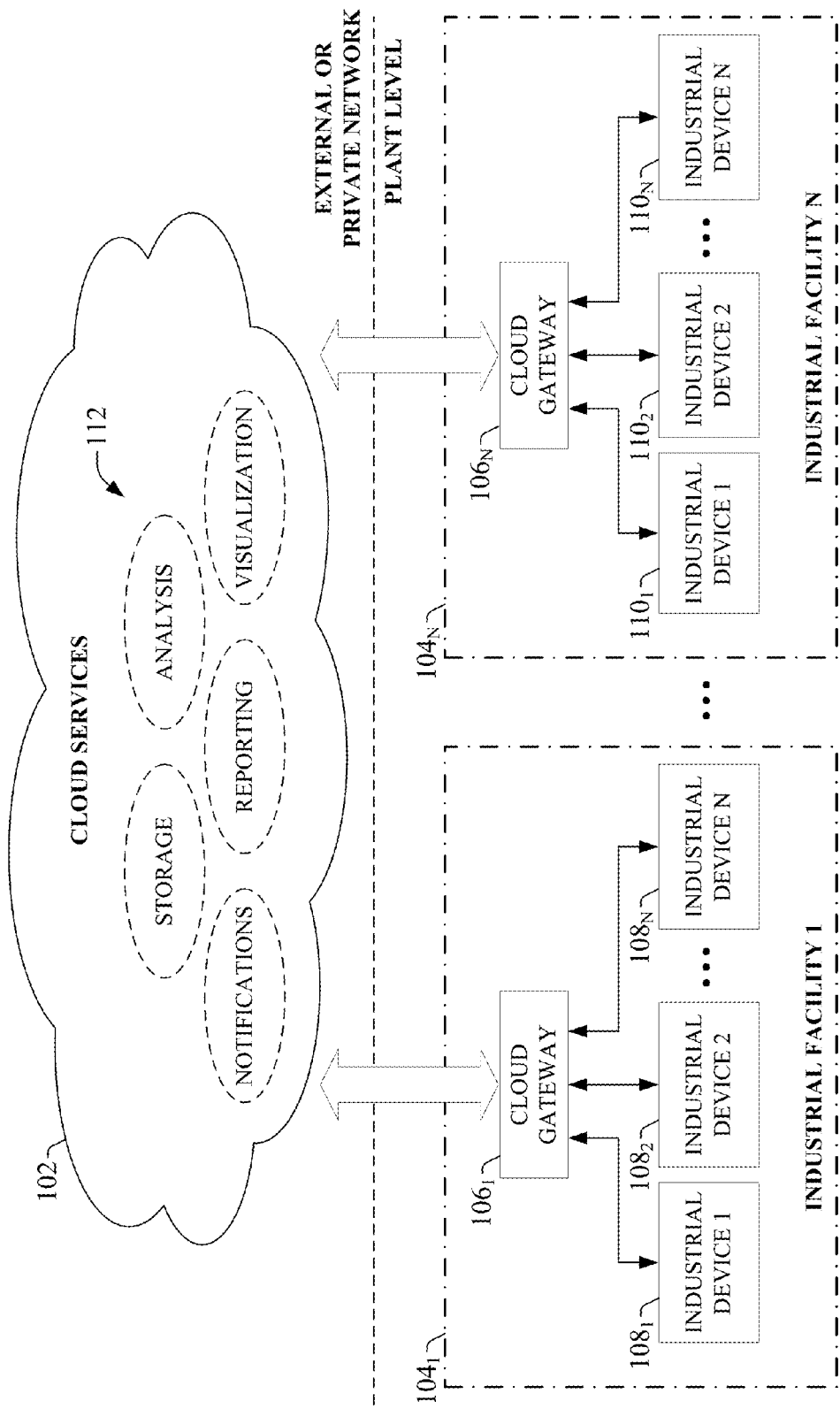
FIG. 1 is a high-level overview of a cloud-based industrial application provisioning system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

To provide a general context for the cloud-based services described herein, FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices may also be part of a mobile control and/or monitoring application, such as a system contained in a truck or other service vehicle.

According to one or more embodiments of this disclosure, industrial devices 108 and 110 can be coupled to a cloud platform 102 to leverage cloud-based applications. That is, the industrial device 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 can reside and execute on the cloud platform 102 as a cloud-based service. In some such configurations, access to the cloud platform 102 and associated services 112 can be provided to customers as a subscription service by an owner of the services 112. Alternatively, cloud platform 102 can be a private cloud operated internally by the enterprise. An exemplary private cloud platform can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), visualization applications such as cloud-based HMIs, reporting applications, Enterprise Resource Planning (ERP) applications, notification services, cloud-based data historian services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices 108 and 110 may access the cloud platform directly using an integrated cloud gateway service.

Providing industrial devices with cloud capability (directly or via cloud gateways 106) can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud platform 102 for aggregation, collation, collective analysis, and enterprise-level reporting without the need to establish a private network between the facilities. Industrial devices 108 and 110 and/or cloud gateways 106 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can access the industrial devices 108 and 110 via cloud gateways 106 to monitor the health of respective automation systems or their associated industrial devices across an entire plant, or across multiple industrial facilities that make up an enterprise. In another example, cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. As these examples demonstrate, the cloud platform 102, working with cloud gateways 106, can allow builders of industrial applications to provide scalable solutions as a service, removing the burden of maintenance, upgrading, and backup of the underlying infrastructure and framework.

Figure 2:
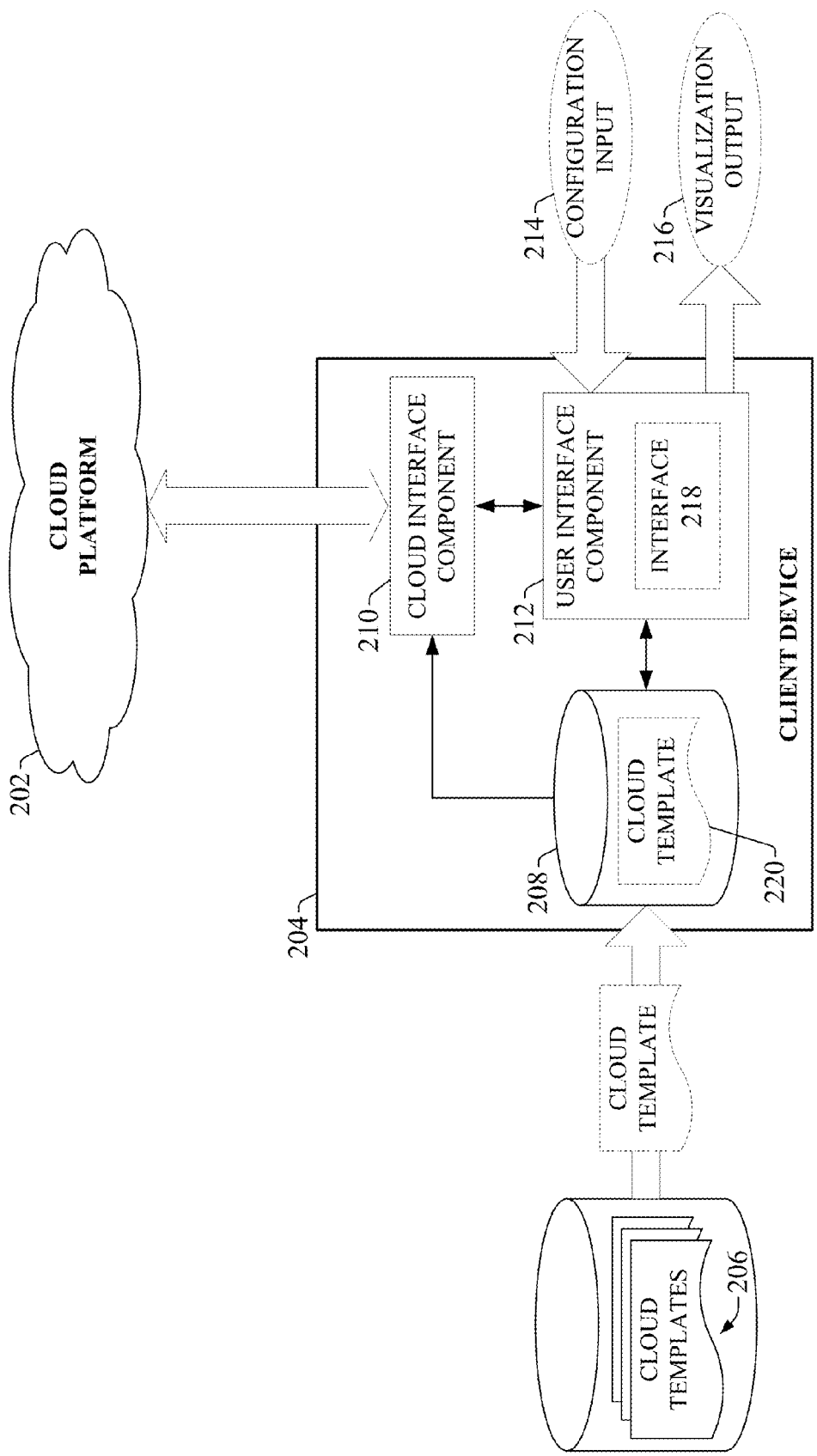
FIG. 2 is a block diagram illustrating configuration of a device using cloud templates.

FIG. 2 is a block diagram illustrating configuration of a device with cloud capabilities using cloud templates according to one or more embodiments of this disclosure. In the present example, client device 204 leverages one or more cloud templates to facilitate remote configuration or viewing of cloud services, to make client device 204 compatible with existing cloud-based services or applications, or to perform other cloud-based functions. Client device 204 can be virtually any type of device used in conjunction with monitor and/or control of an industrial automation system, including but not limited to an industrial controller (e.g., programmable logic controllers or other types of programmable automation controllers); a field device such as a sensor and meter; a motor drive; a human-machine interface (HMI) or other type of operator interface; a data historian; an industrial robot, a barcode marker or reader; a vision system device (e.g., vision camera); a smart welder; or other such industrial devices. Client device 204 may also be a personal user device, such as a mobile phone having graphical display capabilities, a desktop or laptop computer, a tablet computer, or other such devices.

According to one or more embodiments of the present disclosure, a suite of cloud templates 206 are provided that can be utilized by client device 204 to facilitate implementation of cloud-based industrial automation solutions. Cloud templates 206 can comprise pre-verified functional templates that, when retrieved into device storage 208 associated with client device 204, implement cloud functionality on client device 204 in accordance with the particular template selected for use. For example, if cloud template 220 is a control panel template or a dashboard template, cloud template 220 can configure client device 204 to act as a control panel or dashboard for an industrial cloud platform 202 (similar to cloud platform 102 of FIG. 1). To this end, cloud template 220 can render an interface 218 via a user interface component 212 associated with client device 204 that receives configuration input 214 and/or renders visualization output 216 relating to the cloud platform 202. In another example, cloud template 220 may be a historian template that configures client device 204 (which may be an industrial device) to provide industrial data to a cloud-based data historian, operator interface, or reporting application running on cloud platform 202. Cloud template 220 can also be used to configure a cloud interface component 210 associated with client device 204 to communicate and exchange data with cloud platform 202 in connection with its designated functionality. Other exemplary templates include, but are not limited to, virtual machine management templates, process control templates, device hierarchy templates, service templates, etc. These templates will be described in more detail below.

Figure 3:
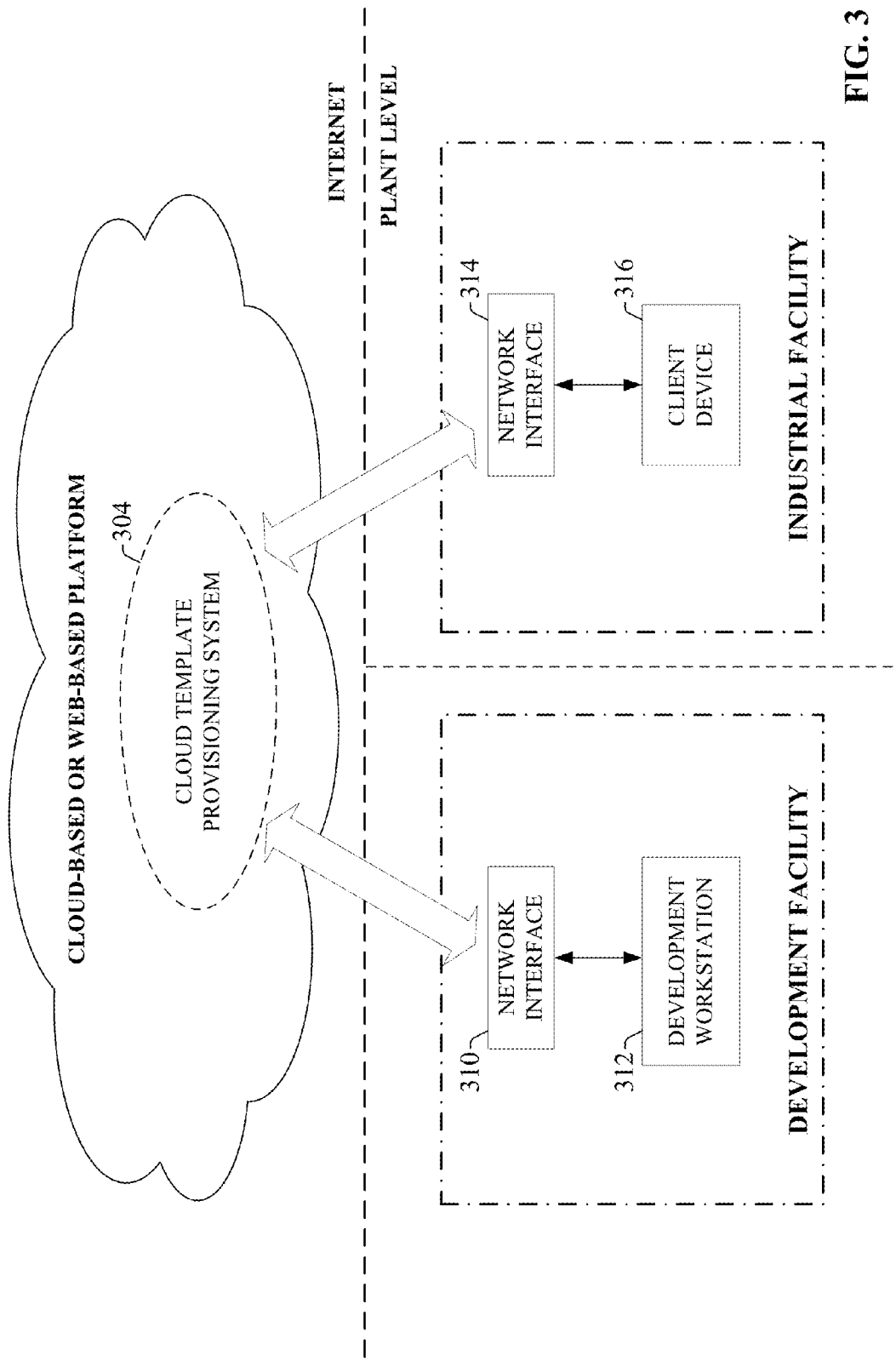
FIG. 3 illustrates a high-level overview of a cloud template provisioning system.

FIG. 3 illustrates a high-level overview of a cloud template provisioning system. In one or more embodiments, cloud template provisioning system 304 can operate as a web-based service on a web platform (e.g., on one or more web servers) to facilitate storage and retrieval of selected cloud templates from a web server accessible by client devices having Internet capability. In one or more other embodiments, the cloud template provisioning system 304 can operate as a cloud service on a cloud platform. In some scenarios, cloud platform 102 can be provided by a cloud provider as a platform-as-a-service (PaaS), and the industrial application provisioning system 104 can reside and execute on the cloud platform 102 as a cloud-based service. In some such configurations, access to the cloud template provisioning system 304 can be provided to customers as a subscription service by an owner of the provisioning system 304.

The cloud template provisioning system 304 is accessible by template developers and template users to facilitate publication and sharing of industrial cloud templates via the cloud or web-based platform. In general, industrial cloud templates can be developed and submitted to the cloud template provisioning system 304 by a development workstation 312 having access to the provisioning system. In an exemplary configuration, development workstation 312 may access the cloud template provisioning system 304 through a separate network interface 310, where the development workstation 312 connects to the network interface 310 through a physical or wireless local area network or radio link. In another exemplary configuration, network interface 310 may be integrated with the development workstation 312, which accesses the cloud or web-based platform directly using the integrated network interface 310.

Client device 316 (typically associated with an industrial facility or enterprise) can access one or more libraries of published industrial cloud templates maintained by the cloud template provisioning system 304. Similar to the development workstation 312, client device 316 can access the cloud template provisioning system 304 via a network interface 314, which can be internal to the client device 316 or a separate interface communicatively connected to the client device 316. Client device 316 may be any suitable device capable of submitting search criteria to the cloud template provisioning system 304 and receiving one or more cloud templates from the provisioning system, including but not limited to a desktop computer, a laptop, or a cloud-capable mobile device such as a mobile phone or tablet computer.

Client device 316 can also be a cloud-capable industrial device, such as an industrial controller (e.g., programmable logic controllers or other types of programmable automation controllers); a field device such as sensor or a meter; a motor drive; a human-machine interface (HMI) station; an industrial robot; a barcode marker or reader; a vision system device (e.g., vision camera); a smart welder; or other such industrial devices. Allowing industrial devices to access the cloud template provisioning system 304, either directly or through a protected network interface or gateway, can offer a number of advantages. For example, an industrial device having an installed cloud configuration template that integrates the industrial device with a cloud-based system (e.g., a cloud-based historian, device management system, notification system, visualization system, etc.) can automatically access the cloud template provisioning system 304 through network interface 314 and retrieve updates to the cloud template when such updates are published to the cloud platform 302.

Figure 4:
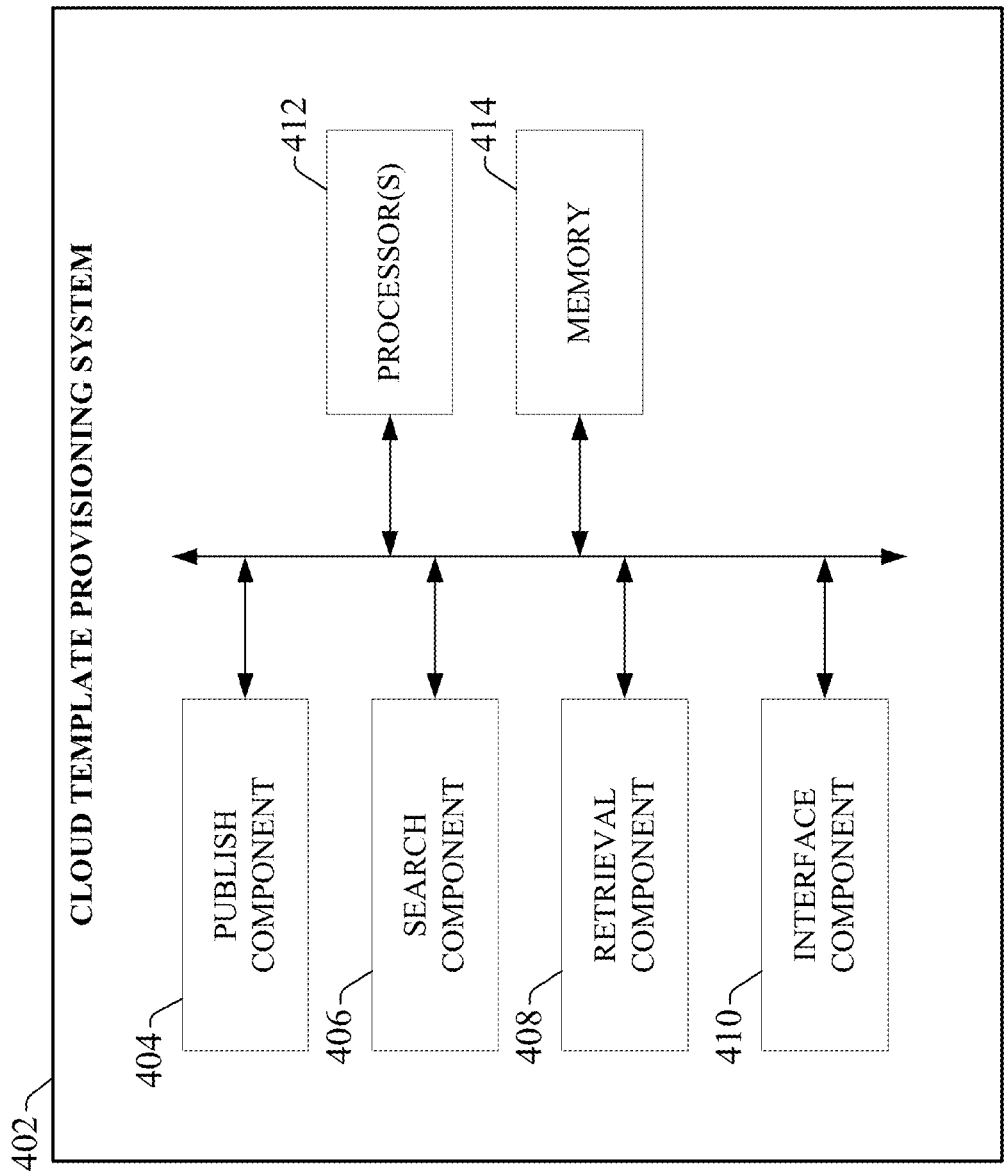
FIG. 4 is a block diagram of an exemplary cloud template provisioning system for receiving, storing, and provisioning cloud templates through a web-based or cloud-based platform.

FIG. 4 is a block diagram of an exemplary cloud template provisioning system that can be used to receive, store, and provision cloud templates through a web-based or cloud-based platform. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud template provisioning system 402 can include a publish component 404, a search component 406, a retrieval component 408, an interface component 410, one or more processors 412, and memory 414. In various embodiments, one or more of the publish component 404, search component 406, retrieval component 408, interface component 410, one or more processors 412, and memory 414 can be electrically and/or communicatively coupled to one another to perform one or more of the functions of the cloud template provisioning system 402. In some embodiments, components 404, 406, 408, 410, can comprise software instructions stored on memory 414 and executed by processor(s) 412. The cloud template provisioning system 402 may also interact with other hardware and/or software components not depicted in FIG. 4. For example, processor(s) 412 may interact with one or more external user interface devices, such as a keyboard, a mouse, a display monitor, a touchscreen, or other such interface devices.

Publish component 404 can be configured to receive submission of an industrial cloud template from a remote client device (e.g., a development workstation 312 having a network interface 310) via a web-based or cloud-based platform and publish the industrial cloud template to one or more template libraries. In some embodiments, memory 414 can comprise multiple storage devices (e.g., a network of storage servers) to allow for storage of large numbers of cloud templates across multiple template libraries. The number of template libraries can be expanded as needed to accommodate a growing number of published cloud templates and related software components.

Search component 406 can be configured to receive search criteria from a remote client device (e.g., client device 316, via network interface 314) via the web-based or cloud-based platform and identify a subset of the cloud templates in the library matching the received criteria. Retrieval component 408 can retrieve the subset of cloud templates identified by the search component 406 and deliver the identified cloud templates to the originator of the search request. This can include sending the cloud templates to the requesting client device over the Internet or via a cloud platform, or sending only a set of indicators identifying the subset of cloud templates.

Interface component 410 can be configured to establish communication and exchange data with remote devices. Accordingly, interface component 410 can authenticate a client device or user wishing to access the cloud template provisioning system 402, receive cloud template submissions, receive search criteria, and send retrieved cloud templates and other user feedback to the remote devices.

The one or more processors 412 can perform one or more of the functions described herein with reference to the systems and/or methods disclosed. Memory 414 can be a computer-readable storage medium (or multiple storage media) storing computer-executable instructions and/or information for performing the functions described herein with reference to the systems and/or methods disclosed.

Figure 5:
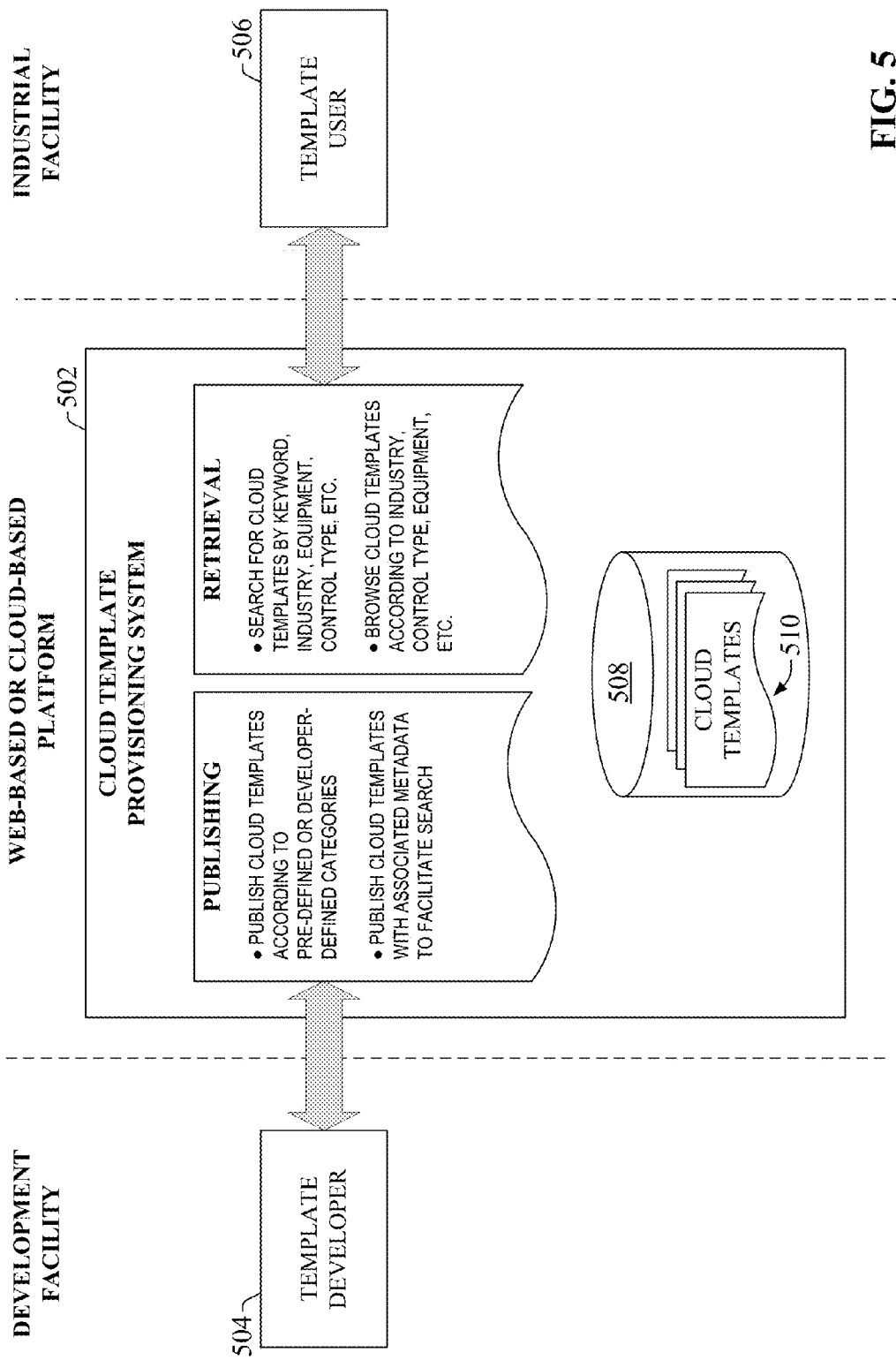
FIG. 5 illustrates a general overview of a cloud template library.

FIG. 5 illustrates a general overview of a cloud template library. Cloud template provisioning system 502 can reside on a web-based or cloud-based platform as described above, and is accessible via a generic Internet layer from any location by devices having suitable access credentials. Cloud template provisioning system 502 can manage one or more cloud template libraries 510 on web-based or cloud-based data storage 508. The cloud template libraries 510 can comprise a plurality of published industrial cloud templates. In one or more embodiments, cloud templates in the cloud template library 510 can be cataloged according to a hierarchical, industry-specific or device-specific storage schema. Since the web-based or cloud-based platform allows storage and processing to be easily expanded as needed, virtually any number of application library instances can be created in connection with the cloud template provisioning system 502, allowing users to search multiple libraries to find relevant cloud templates.

Exemplary cloud templates and related components suitable for storage in the template libraries 510 can include, but are not limited to, cloud control panel templates, cloud dashboard templates, cloud-based virtual machine management templates, cloud-based historian templates, cloud-based process control templates, device hierarchy templates, and/or service templates. These various types of cloud templates are described in more detail below. In addition to the cloud templates and related components, the cloud template libraries 510 can include associated help files, usage tips, frequently-asked-questions (FAQs), instructional videos, or other such materials to guide users in connection with using the respective cloud templates.

The cloud template provisioning system 502 can also be used to facilitate code sharing between cloud template developers over the web-based or cloud-based platform. For example, software developers working in geographically remote locations on a common software project may publish software fixes or new code blocks to the cloud template provisioning system 502 so that co-developers can access the new or updated code during development. Thus, the cloud template provisioning system 502 can facilitate provisioning of not only complete cloud templates, but also add-on functional modules for such cloud templates, template upgrades or bug fixes, extension packs, etc. Publication and provisioning of such modular template components can be performed independently of the provisioning of the cloud templates themselves.

As noted above, the cloud template provisioning system 502 can store industrial cloud templates according to an industry-specific and/or device-specific hierarchical cataloging schema. That is, a template developer 504 can publish their new or modified industrial cloud templates according to pre-defined industry-specific or device-specific categories and sub-categories supported by the catalog's storage structure. Cloud template provisioning system 502 can support a hierarchical arrangement of these categories and sub-categories to simplify subsequent location and retrieval of industrial cloud templates or code segments using browsable search features. Some embodiments of the cloud template provisioning system 502 can also provide a means for template developers 504 to define their own categories for a given cloud template, thereby affording designers a degree of freedom in expanding the hierarchical storage structure of the template libraries 510 as new areas of control evolve. Cloud template provisioning system 502 also supports publishing of samples and documentation together with the published cloud templates.

Authorized template users 506 wishing to locate and retrieve an industrial cloud template can interact with the cloud template provisioning system 502 through a search client served by the provisioning system 502 to the user's client device. The search client can support keyword-based querying of the template libraries 510 and/or a browsable interface that allows the user to navigate the library hierarchy. Both keyword querying and browsed searching permit searching for a given industrial cloud template based on such criteria as applicable industry (e.g., automotive, pharmaceutical, waste water treatment, etc.), type of control project (e.g., motion control, batch processing, material handling, etc.), type of template required, type of industrial device, or any other suitable pre-defined or user-defined category.

In some embodiments, industrial cloud templates can also be searched by vendor or company that developed the template. To facilitate company-based searching, as well as to verify the authenticity of a given cloud template, the cloud template provisioning system 502 can include tools that allow developers to digitally sign their cloud templates before storing the template on the provisioning system. A cloud template can be signed, for example, using a company's unique digital certificate. This can assure an end user that the template is an authentic product of the signing company. Associating the template with a particular company or vendor identification (e.g., a digital signature) can also allow the templates to be searched by company or vendor. In this way, if an end user is only interested in acquiring cloud templates developed by a particular company, the cloud template provisioning system 502 can allow the user to enter the company name as part of the search criteria and return only those template developed by the identified company.

Figure 6:
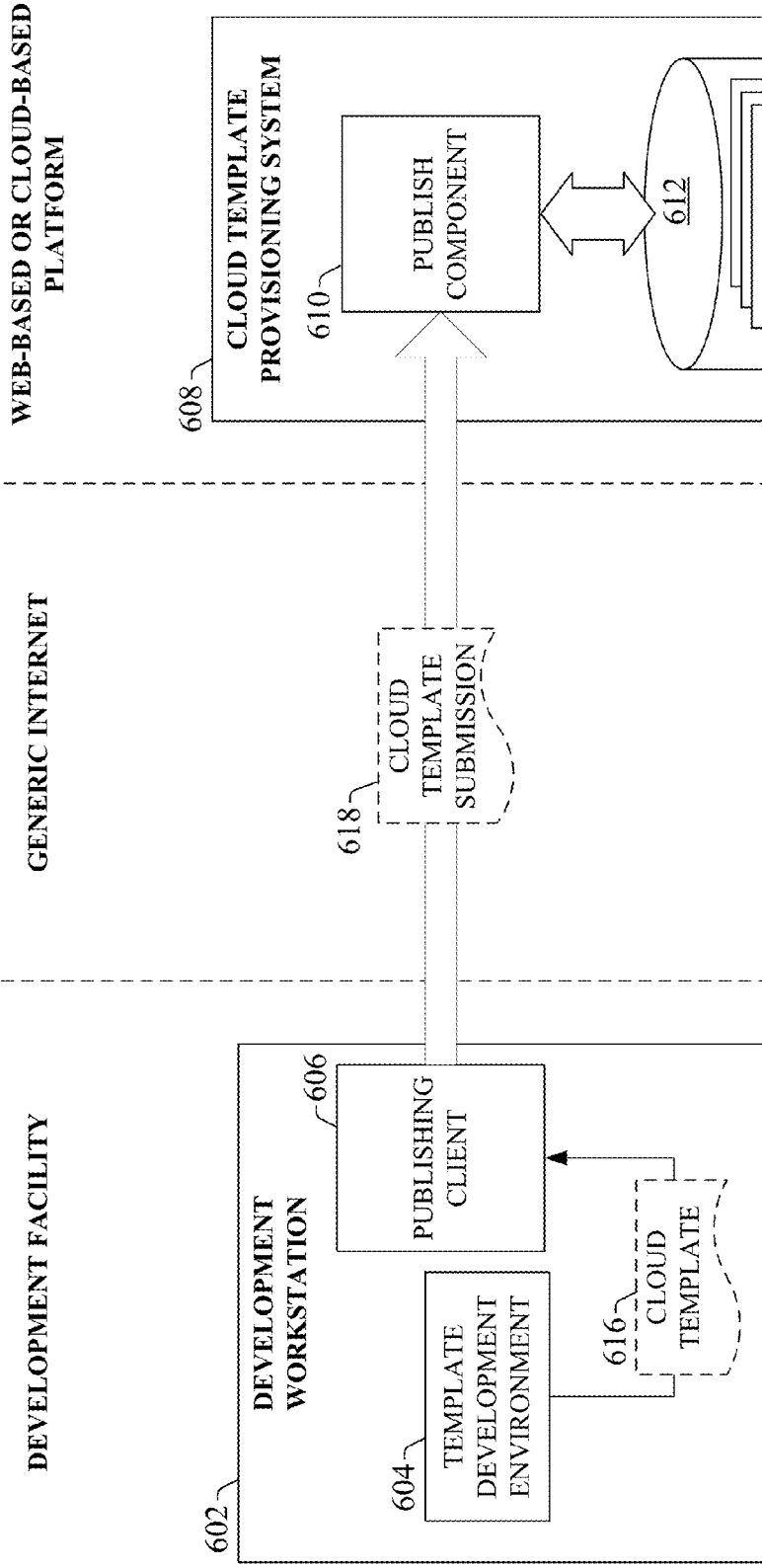
FIG. 6 is a block diagram illustrating the interactions between a cloud template development workstation and a cloud template provisioning system to facilitate publication of a new or modified cloud templates.

FIG. 6 illustrates the interactions between an industrial cloud template development workstation and a cloud template provisioning system to facilitate publication of a new or modified cloud template. Cloud template provisioning system 608 operates on a web-based or cloud-based platform accessible to authorized users via a generic Internet layer. In this example, a cloud template is submitted to the provisioning system 608 by the development workstation 602 on which the cloud template was developed. However, it is to be appreciated that any web-capable device having publishing privileges can submit a cloud template to the provisioning system 608 regardless of the device on which the template was developed.

Template development environment 604 runs on development workstation 602 and is used to develop a cloud template 616, which is to be submitted to the provisioning system 608. Template development environment 604 can comprise any suitable design tool or programming platform that provides a developer the means to create or modify an industrial cloud template for shared use. In some scenarios, template development environment 604 will be a stand-alone development platform. However, some embodiments of the cloud template provisioning system 608 can provide a remote development environment to web-capable or cloud-capable computing devices for development, testing, and debugging of industrial cloud templates. In such embodiments, this web-based development environment can allow users to leverage remote web server or cloud resources (e.g., storage, processing, bandwidth, etc.) to develop cloud templates for subsequent storage and publication on the provisioning system 608. To facilitate access to this cloud-based development environment, the provisioning system 608 can serve a development interface to the development workstation 602 that serves as an interface to the development environment. This can allow the development workstation 602 to access and utilize the development environment from an authorized web-capable or cloud-capable device. In some embodiments, the web-based or cloud-based development environment can include integrated testing and simulation capability, allowing templates in progress to be simulated, tested and debugged; e.g., using cloud resources provided by the cloud-based platform. Templates in development may also be stored on the web-based or cloud-based platform between development sessions. The use of cloud resources to develop templates in this manner can also facilitate sharing of development tasks between geographically diverse template developers, since multiple developers at different locations can access the template in progress from any authorized web-capable computing device.

When a new or modified industrial cloud template is ready for submission to the provisioning system 608, the developer can invoke publishing client 606. The publishing client 606 can be a remote web-based client served by the provisioning system 608, or a locally executed client on development workstation 602 that can be invoked and communicatively linked to the provisioning system 608 over the Internet. Publishing client 606 can include functionality that allows a developer to associated metadata with the cloud template that can subsequently be used by the provisioning system 608 to classify the cloud template within an industry-specific or device-specific storage hierarchy. Publishing client 606 can also include functionality that allows the developer to submit documentation for the cloud template to the provisioning system 608. When the developer has prepared the cloud template for submission and associated all desired metadata and documentation with the template, publishing client 606 can be instructed to send a cloud template submission 618 to the provisioning system 608 on the cloud-based or web-based platform. In some embodiments, cloud template provisioning system 608 may only allow template submission by registered users. Accordingly, the provisioning system 608 can perform a suitable authentication procedure to ensure that the user submitting the cloud template submission 618 is an authorized user of the system.

The cloud template submission 618 is submitted to the provisioning system 608, where a publish component 610 adds the template to the cloud template library 614. Cloud template library 614 can be maintained on one or more data stores 612 (e.g., data stores on a cloud platform or associated with one or more web servers). Publish component 610 can parse any metadata tags included in the cloud template submission 618 to determine proper classification of the cloud template within the library's storage hierarchy. As discussed above, the submitted cloud template can be classified within the library 614 according to a hierarchy of industry-specific or device-specific categories to facilitate guiding a user to a desired industrial cloud template suitable for a given industry, device, and/or task. For example, publish component 610 can read Control Type, Industry, Category, and/or Sub-Category fields of a metadata tag submitted with the cloud template submission 618 and associate the cloud template with a hierarchical path corresponding to the values in those fields. To facilitate simple and flexible cataloging of the cloud template, publishing client 606 can allow developers at development workstation 602 to either select values for those fields from a list of classifications already existing in library 614, or to define new designer-supplied industry, device, and/or category classifications. Thus, if publish component 610 determines that a Sub-Category field in a metadata tag contains a new classification, the publish component 610 can create a new branch at an appropriate location within the library hierarchy corresponding to the new designer-supplied classification, and associate the new cloud template with this new pathway in the library 614.

Figure 7:
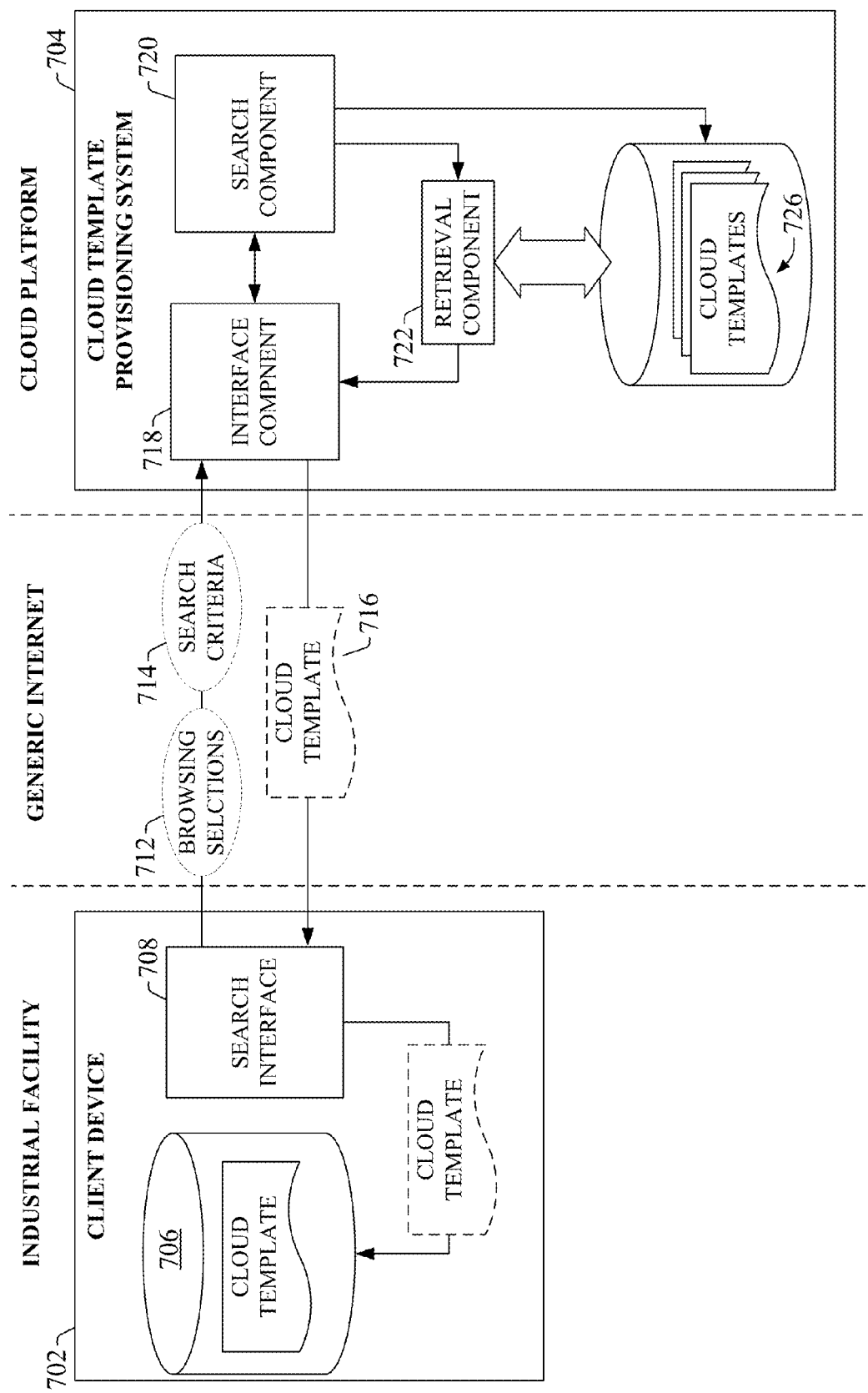
FIG. 7 is a block diagram illustrating the interactions between a client device and a cloud template provisioning system for location and retrieval of a desired cloud template.

FIG. 7 illustrates the interactions between a web-capable or cloud-capable client device and the cloud template provisioning system for location and retrieval of a desired industrial cloud template from the catalog. Client device 702 can be any suitable Internet-capable computing device having authorization to access cloud template provisioning system 704. Typically, client device 702 will be associated with an industrial facility. Client device 702 can invoke search interface 708 to facilitate access to the provisioning system 704. Search interface 708 can be a local application that executes on client device 702 and that is configured to connect to and interact with the provisioning system 704. Search interface 708 may also be a specialized interface served to the client device 702 by the provisioning system 704 in response to a request from the client device 702 to access the provisioning system 704. Search interface 708 can include a set of graphical user interface (GUI) elements for submitting search criteria to the provisioning system 704, browsing the contents of the provisioning system's template libraries, receiving selection input from a user of the client device 702, providing status and feedback information to the user, or any other suitable graphical elements that facilitate search and retrieval of desired industrial cloud templates in cloud template library 726.

In one or more embodiments, location and retrieval of a cloud template can be effected by submitting keyword-based search criteria 714 to the provisioning system 704 via search interface 708. Search interface 708 can submit the search criteria 714 to the cloud-based provisioning system 704 across a generic Internet layer. Search criteria 714 can comprise one or more keywords entered by the user using the search interface 708. In some embodiments, a user can submit keywords that identify one or more of an industrial domain, a control type (e.g., discrete control, process control, etc.), a type of automation application, a device or piece of equipment, an industry standard, or any other terms that can be used by the provisioning system 704 to identify a desired subset of industrial cloud templates stored in cloud template library 726. In one or more embodiments, a subset of the search criteria 714 can also be inferred by the search interface 708 based in part on extrinsic data relating to the user's existing control system.

When search criteria 714 is submitted to the provisioning system 704, an interface component 718 receives the search criteria 714 and passes the criteria to a search component 720, which identifies a subset of cloud templates stored in cloud template library 726 (similar to template library 510 of FIGS. 5 and 614 of FIG. 6) that satisfy the submitted criteria. To determine whether a given stored cloud template meets the search criteria 714, search component 720 can cross-reference the search terms contained within the search criteria 714 against the given cloud template's metadata tags, hierarchy classifications, inherent properties of the template (e.g., parameters, inputs and outputs, data types, animation types, etc.), or other defined or inherent properties of the cloud template.

Moreover, one or more embodiments of search component 720 can support "approximate match" searching, such that exact matches between the submitted search criteria 714 and a potentially relevant cloud template's metadata or properties is not necessary in order for the cloud template to be selected for inclusion in the retrieved subset. In this regard, any suitable "fuzzy search" methodology can be employed to ensure that useful cloud templates are returned even in the absence of an exact match. In one exemplary approach, upon receipt of search criteria 714, search component 720 can calculate one or more figures of merit for each cloud template in the library 726 relative to the search criteria. Each template's figure of merit is a relative measure of how relevant the given template is likely to be to the search criteria. For example, if a search criterion stipulates that a requested cloud template is to be used to configure and manage a cloud-based motion control system, the search component 720 can generate a "control type" figure of merit for each cloud template in the library 726 indicating a relative applicability to motion control. Cloud templates whose metadata explicitly specifies "motion control" as an applicable control type will be given the highest figure of merit. Templates whose metadata specifies a different control type that has similarities to motion control type applications (e.g., commonly employs similar equipment or processes, etc.) will be given a comparatively high (though not the highest) figure of merit with respect to cloud templates designed for configuration and monitor of other types of control systems. When all figures of merit have been identified, search component 720 can identify the subset of cloud templates having a figure of merit above a threshold value as being sufficiently relevant to the search criteria. According to one or more embodiments, multiple figures of merit can be calculated for each cloud template for a given set of search criteria, where each figure of merit relates to a particular search dimension or aspect (e.g., industry, control type, category, industrial device, desired functionality, etc.). In such embodiments, a composite figure of merit can be computed based on the individual figures of merit for the various search dimensions, and the relevant subset of cloud templates can be selected by the search component 720 based on this composite value.

After the subset of relevant cloud templates from library 726 has been identified, the provisioning system 704 can render a list of the identified cloud templates on the search interface 708 for selection by the user. Each item in the list can include a description of the template, including information derived from the template's metadata (e.g., control type, industry, device, function, etc.). The search interface 708 can receive input from the user indicating selection of one of the cloud templates in the list, and inform the provisioning system 704 of the user's selection. Based on the user selection, the retrieval component 722 retrieves the identified cloud template from the template library 726.

In one or more embodiments, template libraries 614 and 726 described above can comprise centralized, common libraries accessible to suitably authorized users across multiple locations and enterprises (e.g., via a subscription service). In some embodiments, particularly those in which the provisioning system executes on a cloud platform, the cloud template provisioning system can also allow users to create and maintain personal libraries on the cloud platform for storage of selected cloud templates or related software components. In such embodiments, the system allows the user to import cloud templates (or related components) into their personal cloud-based template library from other libraries (e.g., the commonly accessible library described above) or to publish their own user-developed templates and related components to the personal library. Such personal template libraries can utilize a subset of cloud resources (e.g., storage, processing, and/or bandwidth) allocated to the user or the user's business enterprise. The system can allow the user to configure these personal template libraries such that access to the templates and related software components stored thereon is limited to authorized personnel within their company. In this way, the system allows the user to build custom cloud template libraries for personal or internal use, comprising templates or associated software component of particular value or potential utility for the user or enterprise.

Figure 8:
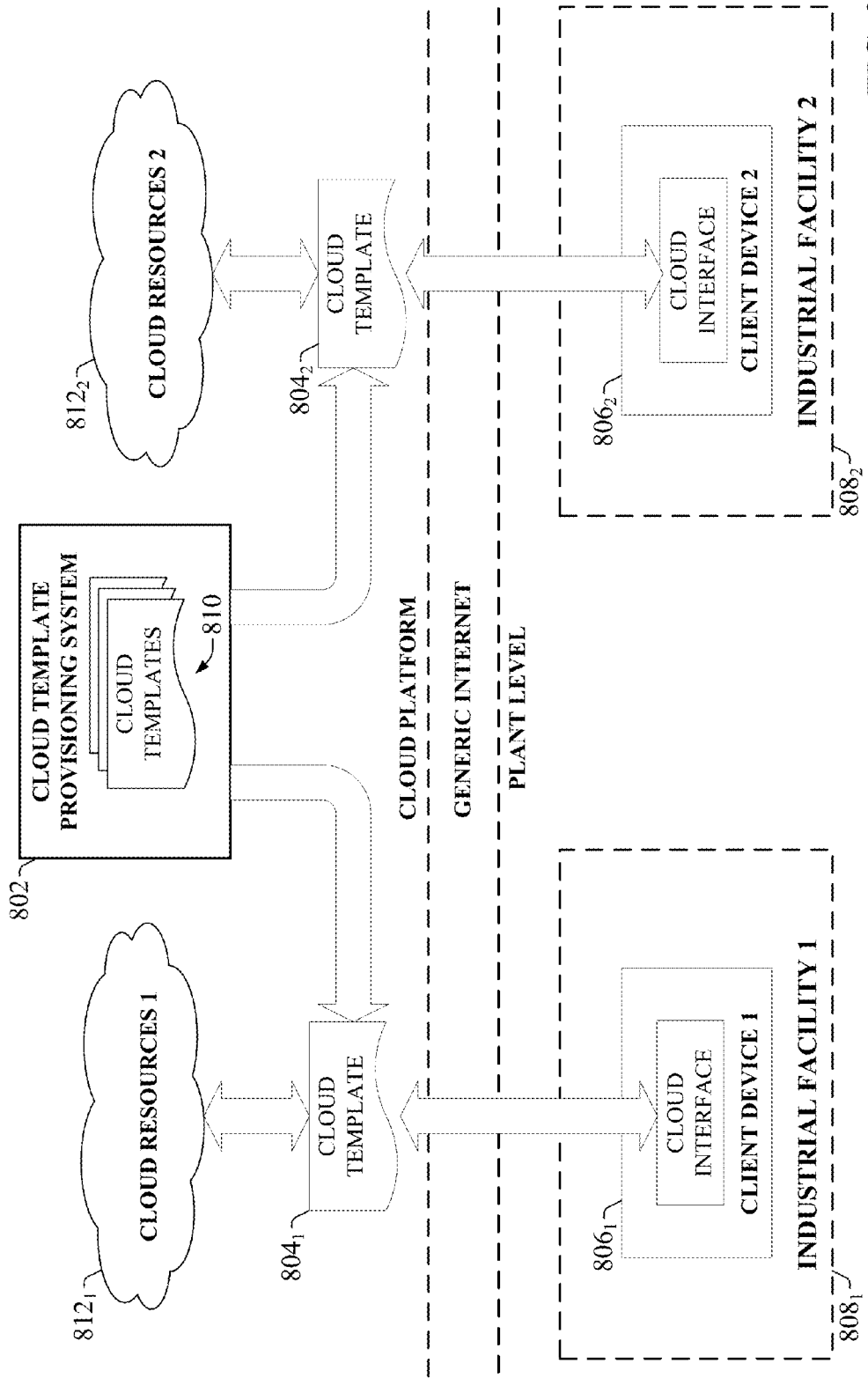
FIG. 8 is a block diagram illustrating remote execution of cloud templates using cloud resources assigned to respective industrial facilities.

In some embodiments, the provisioning system 704 can provide the retrieved cloud template 716 to the client device over the Internet for local usage. That is, the selected cloud template 716 can be downloaded from the provisioning system 704 and stored on local storage 706 at the client device. Alternatively, some embodiments of the provisioning system 704 can allow certain cloud templates to be run remotely using cloud resources provisioned to the user or to the industrial facility. FIG. 8 illustrates remote execution of cloud templates using cloud resources assigned to respective industrial facilities. Client devices $806_1$ and $806_2$ at respective industrial facilities $808_1$ and $808_2$ can access cloud template provisioning system 802 residing on a web-based or cloud-based platform. As in previous examples, the client devices $806_1$ and $806_2$ can access the provisioning system 802 through a generic Internet layer. In the present example, each of the industrial facilities $808_1$ and $808_2$ are allocated respective cloud resource provisions $812_1$ and $812_2$, where the resource provisions $812_1$ and $812_2$ can comprise allocations of cloud storage, processing, and/or bandwidth provided by a cloud platform for use by the respective industrial facilities $808_1$ and $808_2$. For example, an owner of the cloud platform may offer subscription services to industrial facilities for use of a predetermined amount of cloud resources, which the facilities can use for off-site historian and data storage functions, execution of cloud-based applications or virtual machines using portions of the cloud platform's processing capacity, or other such services.

As in previous examples, client devices $806_1$ and $806_2$ can search for and retrieve desired industrial cloud templates from the template library 810 managed by provisioning system 802. However, rather than downloading the selected templates to the client devices $806_1$ and $806_2$ for local use at the respective facilities $808_1$ and $808_2$, the selected templates according to the present example can instead be executed on the cloud platform using a portion of each facility's allocated cloud resources $812_1$ and $812_2$. In some cases, cloud-based execution of industrial cloud templates may not be appropriate, as in the case of cloud templates used to locally configure industrial devices to interact with a cloud-based application running on a cloud platform. However, some cloud templates could beneficially be maintained and executed remotely on the cloud platform as illustrated in FIG. 8. Such applications can include, for example, control panel or dashboard templates that allow an administrator to configure and monitor aspects of a cloud-based industrial system running on cloud resources 812, virtual machine management templates that allow a user to create, start, stop, or delete virtual machines running on the cloud resources 812, or other such cloud templates. In such examples, users (e.g., system administrators or plant engineers) can invoke their respective cloud templates 804 from cloud storage via client devices 806 and configure or monitor cloud-based systems on their respective cloud resources 812 via the cloud templates 804.

Although the cloud template examples described below generally refer to cloud templates that are installed and executed on local devices (e.g., client devices, industrial devices or equipment, etc.), it is to be appreciated that the cloud templates described herein can also be maintained and executed on cloud resources associated with the industrial enterprise in some embodiments, as depicted generally in FIG. 8 and described above.

In addition to query-based searching, one or more embodiments of the cloud template provisioning system can also support browsed searching of the cloud template library 726 by allowing the user to navigate the classification hierarchy until a desired cloud is found. Returning now to FIG. 7, search interface 708 can provide a browsable interface that allows the user to select classifications corresponding to the classification nodes of the library hierarchy. For example, search interface 708 can present a list of industries, devices, vendors, control system types, etc. represented in the library hierarchy on a home menu. For example, selection of an industry from this list can cause the search interface to submit a corresponding browsing selection 712 to interface component 718 of the provisioning system 704, which routes the browsing selection to the search component 720 for processing. Search component 720 can retrieve control types, application types, devices, categories, sub-categories, and other classifications associated with the selected industry. Interface component 718 returns this information to the search interface 708, which can render the available categories associated with the selected industry and, optionally, a list of available cloud templates associated with all categories and sub-categories depending from the selected industry. The list of cloud templates can be gradually narrowed as the user navigates through lower tiers of the hierarchy in this manner until the user selects a cloud template from the list or until a lowest tier of the hierarchy is reached.

Figure 9:
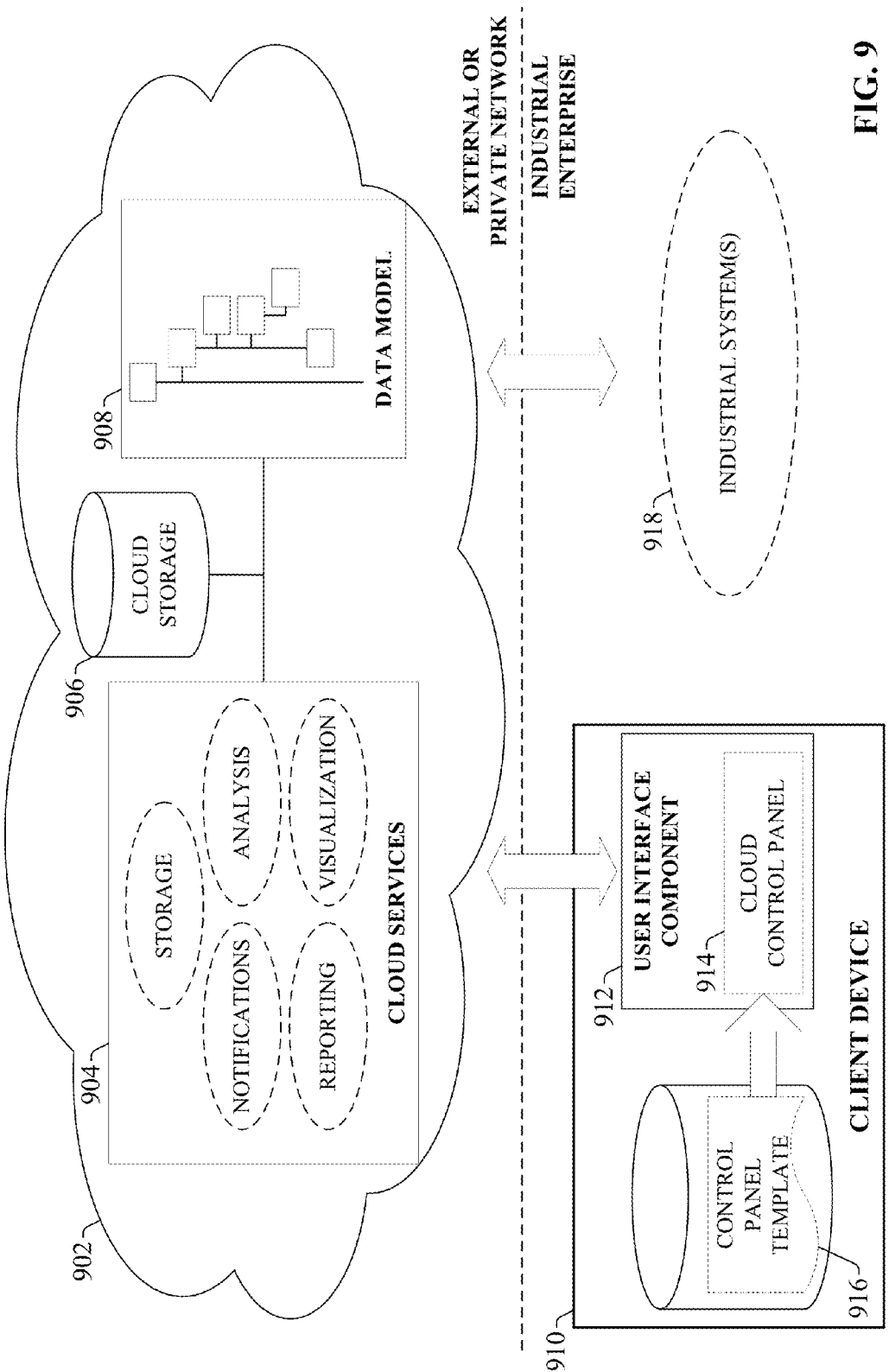
FIG. 9 illustrates configuration of a cloud-based system using a control panel template.

As noted above, one or more types of cloud templates described herein can allow users to quickly and easily implement cloud-based solutions for industrial automation. The templates can facilitate building and managing cloud environments that can be used in conjunction with an end user's industrial automation system, including but not limited to cloud-based historian systems, operator interface systems, virtual machine environments, cloud-based product tracking systems, or other such cloud applications. For example, FIG. 9 illustrates a control panel template that can provide control over one or more aspects of a cloud-based industrial system.

As described above in connection with FIG. 1, cloud platform 902 (similar to cloud platform 102) can host one or more cloud services 904 (e.g., data storage, data analysis, data historian services, control applications including cloud-based virtual machines, operator interface applications, reporting applications, notification services, etc.). For example, a cloud-based historian service may execute on cloud platform 902 to facilitate collection and storage of historian data collected from one or more controlled industrial systems 918 on the plant floor. In such a system, the industrial systems 918 may comprise a plurality of data historians distributed across multiple levels of an industrial enterprise and/or across multiple plant facilities of the enterprise. These distributed data historians can collect and cache selected data from devices across the enterprise (e.g., industrial controllers, sensors, business servers, etc.) and migrate the data to the cloud platform 902 to be archived in cloud storage 906. In another example, cloud platform 902 can host an operator interface service that allows the industrial systems to be monitored and/or controlled remotely via cloud platform 902. In such systems, an operator interface system running as a service on cloud platform 902 can receive industrial data from the industrial systems 918 (e.g., via cloud gateways, such as cloud gateways 106 of FIG. 1), and render the industrial data on authorized Internet-capable devices via customized operator interface screens served to the devices from the cloud platform 902. In yet another example, cloud platform 902 can host can execute one or more virtual machines designed to collect production data from the industrial systems 918 and perform analytics on the data. The virtual machine can use the results of such analysis provide supplemental control data to industrial systems.

Depending on the type of cloud-based applications or services being executed, cloud platform 902 may also maintain a data model 908 that can be leveraged by the applications in conjunction with performing various functions. Data model 908 can represent an industrial enterprise in terms of multiple hierarchical levels, and can facilitate integration of devices comprising the industrial systems 918. Data model 908 can also provide a unified presentation of system data within the overall context of the enterprise, as will be discussed in more detail below.

These cloud-based applications are only intended to be exemplary, and it is to be appreciated that virtually any type of cloud-based industrial application can be monitored, configured, and controlled using the control panel template described herein.

To facilitate high-level management of the cloud-based industrial applications or services, a control panel template 916 can be provided. Control panel template 916 can be acquired, for example, from a template library managed by a cloud template provisioning system (e.g., cloud template provisioning systems 304, 402, 502, 608, 704, and/or 802 described above). Control panel template 916 may also be provided to an end user via a portable computer-readable storage medium (e.g., compact disk, flash drive, etc.). Installing and executing control panel template 916 on an Internet-capable client device 910 (e.g., a laptop computer, desktop computer, cellular phone, or other such device) can render a cloud control panel 914 via a user interface component 912 of the client device. Cloud control panel 914 serves as a front-end interface that allows an administrator to intuitively control many high-level aspects of the cloud-based system.

For example, cloud control panel 914 can include an interface section for managing user access to certain features of the cloud-based applications or services. For cloud-based historian applications, this can include specifying which users are authorized to access selected subsets of historian data stored on cloud storage 906. For cloud-based visualization, reporting, or operator interface applications, this can include defining user access privileges to particular operator interface screens or reports. To these ends, cloud control panel 914 can include an interface section that allows entry of relevant information for identifying and accessing the cloud platform 902 (e.g., a uniform resource locator of the particular cloud platform associated with the user's industrial systems, facility, or enterprise; administrative credentials, etc.). This information allows client device 910 to communicatively connect to the cloud platform 902 and exchange data therewith. Client device 910 can access cloud platform 902 via an integrated network interface or through a separate cloud gateway device. Cloud control panel 914 can also include screens for creating user profiles associated with plant personnel and defining access privileges for the respective profiles. The administrator can configure usernames and passwords for each user profile via the cloud control panel 914. Client device 910 can then send this user profile information to the cloud platform 902 to facilitate configuration of user access privileges. The user profile information can be stored in a dedicated profile storage area of cloud storage 906. Thereafter, a device that access the cloud services on cloud platform 902 using credentials associated with one of the configured user profiles will be granted access privileges to the cloud-based applications and services defined for the user profile. Thus, cloud panel template 916 transforms client device 910 into a cloud administrative tool that allows a system administrator or other user to manage user access privileges to services hosted by cloud platform 902.

In some embodiments, cloud control panel 914 can also manage billing aspects in connection with cloud-based applications and services. For example, cloud control panel 914 can include data entry portions that allow entry of debit account information for an individual user of cloud services 904 or a business entity to which the cloud services 904 are provisioned. The entered billing information can be sent to cloud platform 902 by the client device 910 for storage in a preconfigured partition of cloud storage 906. Cloud control panel 914 can also include data entry portions that allow the administrator or other user to associate service fees or charging rates with particular types of usage of the cloud services 904. For example, through cloud control panel 914, the user of client device 910 can define a per-minute charge for access to a cloud-based operator interface service, a fee structure for usage of cloud storage 906 for cloud-based data historian applications, charges associated with a cloud-based notification or reporting application, or other appropriate billing information. Cloud platform 902 can then use this billing information to automate billing and/or account debiting in connection with usage of the cloud-based applications and services.

In general, control panel template 916 can allow a number of high-level cloud administrative aspects to be managed via client device 910. Cloud control panel 914 generated by control panel template 916 can include a number of intuitive interface features that allow a system administrator or other user to configure and manage these aspects via any suitable client device 910 having Internet access. There may be various types of control panel templates catered to particular types of cloud-based applications or services. For example, one type of control panel template may be configured for administration and management of a cloud-based data historian service, while another type of control panel template may be configured for administration and management of a cloud-based operator interface service. The control panel template types can be further categorized according to industry types (e.g., automotive, food and drug, oil and gas, power generation, etc.). These various types of control panel templates can be located and retrieved from the cloud template provisioning system using the search techniques described above. For example, the various types of control panel templates can be cataloged in the template libraries of the cloud template provisioning system according to industry type, type of cloud service, etc. Accordingly, users can access the cloud template provisioning system and browse to the control panel template suitable for their particular cloud application and industry.

Although control panel template is illustrated in FIG. 9 as being installed on a client device 910 such that cloud configuration data is provided to cloud platform 902 from a locally executing cloud control panel 914, one or more embodiments of control panel template 916 can be executed on cloud platform 902 and accessed remotely by client device 910 to facilitate entry and submission of cloud configuration data (as illustrated in FIG. 8).

Figure 10:
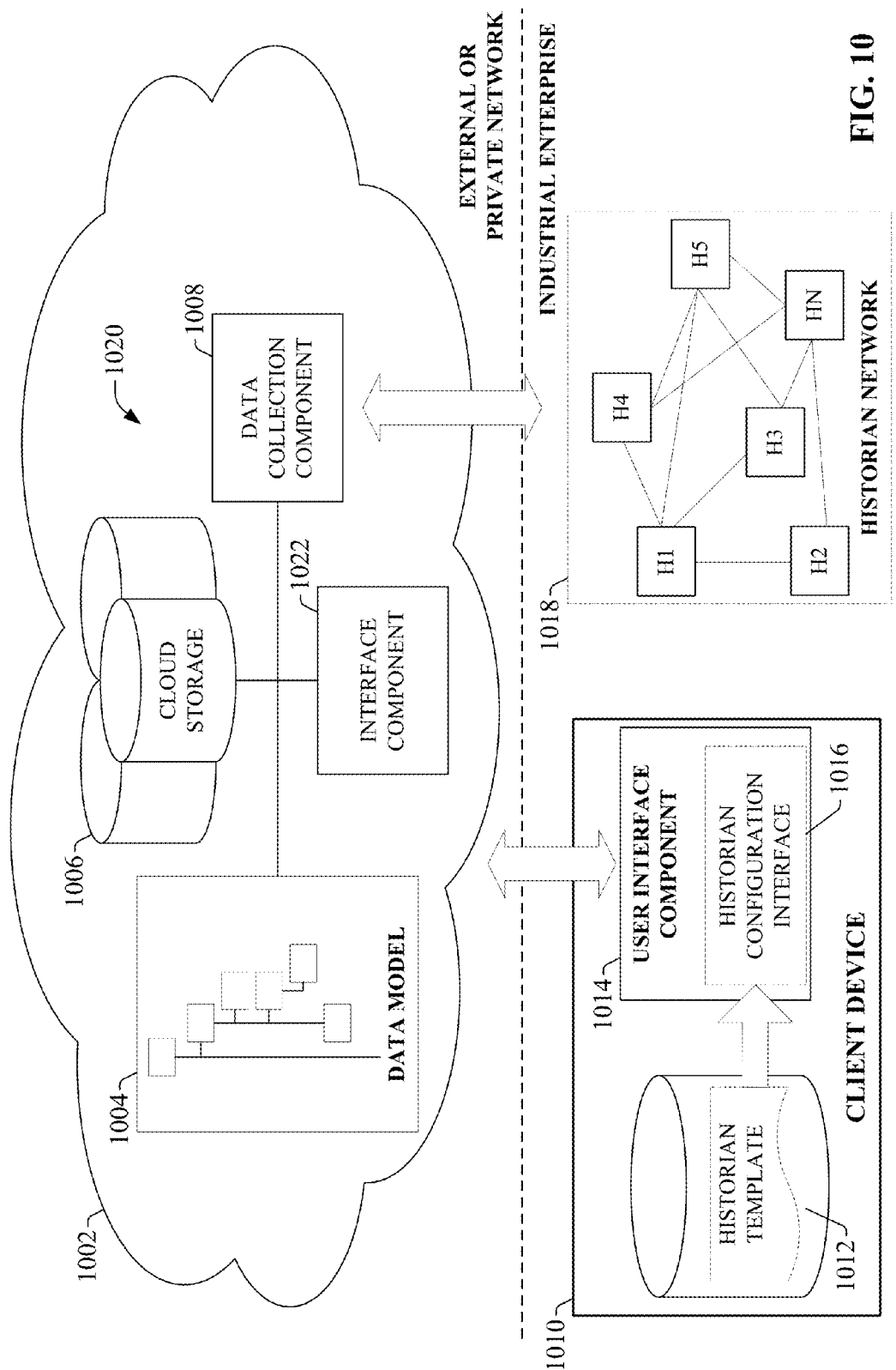
FIG. 10 illustrates configuration of a cloud-based data historian system using a historian template.

FIG. 10 illustrates an exemplary cloud-based data historian system 1020 that can be configured and managed using a historian template. In this example, storage and processing resources of cloud platform 1002 are used for storage, management, and provision of historian data collected from a plurality of local historians 1018 distributed across an industrial enterprise. Local historians 1018 are local data storage devices that aggregate and store data generated by industrial devices comprising a controlled system (e.g., industrial controllers, sensors, meters, etc.), or by business-level devices at other levels of the enterprise (e.g., business servers, enterprise resource planning systems, etc.). Each of the local historians 1018 can offer a platform that provides high speed, time series data storage and retrieval from multiple controllers or devices. For example, some local historians 1018 can communicate with industrial controllers or other industrial devices through standard network interfaces or across the controllers' respective backplanes. In some implementations, the respective historians H1-HN can archive data to an Archive Engine that provides additional storage capabilities. In some scenarios, one or more of the local historians 1018 can comprise live data servers, which hold live (e.g., near real-time) data which can then historized to cloud storage 1006 for archival storage. Live data maintained by such live data servers can include, for example, near real-time telemetry or status data generated by industrial controllers or other industrial devices.

To facilitate archival of data from the local historians 1018 to cloud storage 1006, a data collection component 1008 on cloud platform 1002 monitors and collects specified data values from local historians 1018 and migrates the data to cloud storage 1006. In some embodiments, the cloud-based data historian system can include a data model 1004 (similar to data model 908 of FIG. 9) that hierarchically models the industrial enterprise on which local historians 1018 reside. In one or more embodiments, data model 1004 can represent the industrial enterprise in terms of multiple hierarchical levels, where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.).

Figure 11:
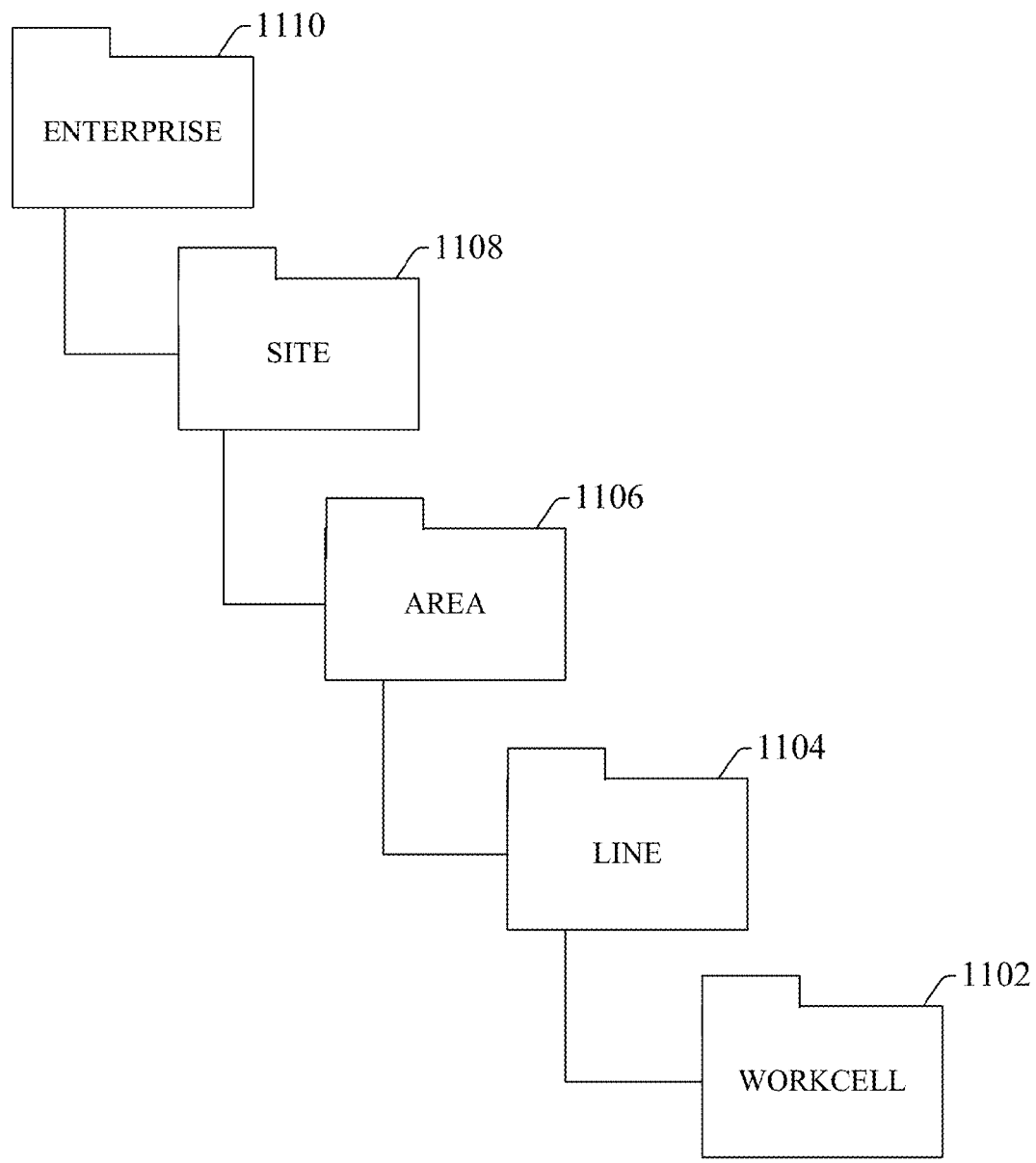
FIG. 11 illustrates an exemplary organizational hierarchy that can be used as a basis for an organizational data model.

Turning briefly to FIG. 11, an exemplary organizational hierarchy that can be used as a basis for data model 1004 is illustrated. In this exemplary organizational model, the hierarchical levels can include—from lowest to highest—a workcell level 1102, a line level 1104, an area level 1106, a site level 1108, and an enterprise level 1110. The type instances described above—representing units of the enterprise—can be defined for respective levels of this hierarchical structure. In one or more embodiments, the cloud-based data historian system 1020 can provide a standard set of types that allow the user to model an industrial enterprise in terms of these standard types. The cloud-based data historian system 1020 can also allow custom types to be created, allowing users to represent their particular business or manufacturing processes using a combination of standard and user-defined types.

Figure 12:
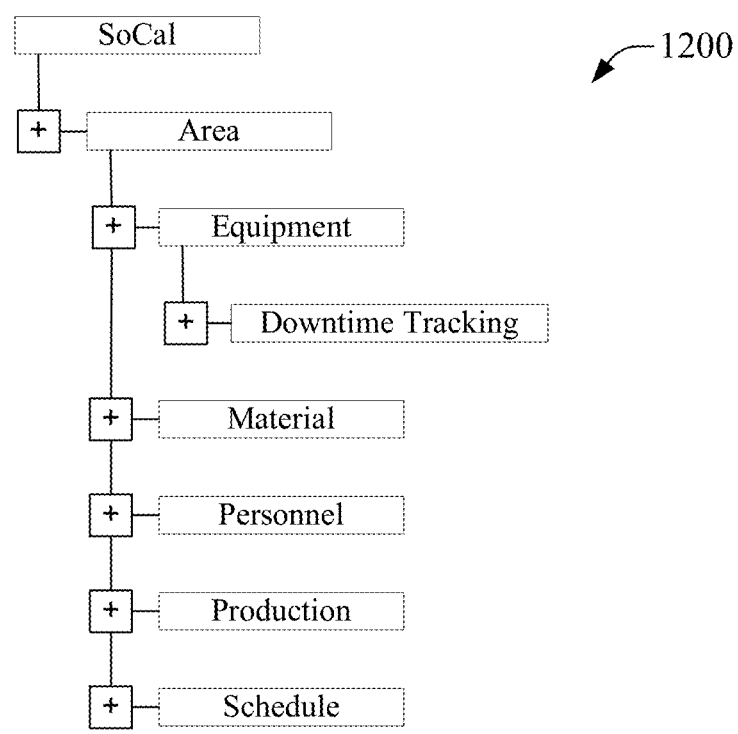
FIG. 12 illustrates an exemplary portion of a browsable hierarchy for locating and viewing data.

Data model 1004 allows devices of an automation system, their associated historians, and data items stored therein to be described and identified in terms of these hierarchical levels, allowing a common terminology to be used across the entire enterprise to identify devices and historian data associated with those devices. Thus, individual items of historian data (e.g., live analog and digital values stored in controller tags, archived data values stored in a historian register or other long-term data storage device, etc.), when integrated into cloud-based data historian system 1020, can be identified and viewed through an interface component 1022 by unique historian tags defined by data model 1004. For example, through adherence to data model 1004, a given item of historian data can be identified with a historian tag or identifier that indicates the data item's origin or context within the organizational hierarchy (e.g., SoCal:DieCastArea:#1HeadlineMachine:DowntimeTracking:DowntimeMinutes). Data model 1004 can represent industrial controllers, devices, machines, or processes as data structures (e.g., type instances) within this organizational hierarchy to provide context for data generated and stored throughout the enterprise relative to the enterprise as a whole. An exemplary portion of a browsable hierarchy 1200 based on enterprise units defined for data model 1004 is illustrated in FIG. 12. Thus, data model 1004 can provide context enhancement that replaces the flat name structure that may be employed within the individual local historians 1018.

Historian template 1012 can be provided to facilitate simplified and intuitive implementation of cloud-based data historian system 1020. Similar to the control panel template described above in connection with FIG. 9, the historian template 1012 can be retrieved from a cloud template provisioning system (or installed from a portable computer-readable storage medium) and installed on client device 1010 (similar to client device 910 of FIG. 9). Execution of historian template 1012 by client device 1010 can render a historian configuration interface 1016 on a user interface component 1014 of client device 1010. Historian configuration interface 1016 can provide intuitive controls that allow an administrator or other user to configure, monitor, and manage cloud-based historian system 1020. For example, historian configuration interface 1016 can include an interface section that allows entry of relevant information for identifying and accessing the cloud platform 1002 on which the cloud-based historian system 1020 is to be configured (e.g., a uniform resource locator of the particular cloud platform associated with the enterprise, etc.). This information allows client device 1010 to communicatively connect to the cloud platform 1002 and exchange data therewith. As in previously described examples, client device 1010 can access cloud platform 1002 via an integrated network interface or through a separate cloud gateway device.

Historian configuration interface 1016 can also include an interface section through which data model 1004 is configured. This can include defining one or more levels of the enterprise hierarchy, local historians 1018 associated with the respective levels, and the hierarchical relationships between the historians. Historian configuration interface 1016 can also include a data tag configuration section that allows the administrator or other user to specify which data items stored in the local historians 1018 are to be aggregated and archived on cloud storage 1006. For example, historian configuration interface 1016 can include fields that allow the user to identify a device on the enterprise (e.g., one or more local historians 1018, a controller, a business server, etc.) and a particular data tag of the device containing the data to be collected. In some embodiments, the device and/or data tag can be specified by browsing a graphical representation of data model 1004 rendered on the historian configuration interface 1016 and selecting the data item to be collected and stored from the hierarchical representation. Historian configuration interface 1016 can also include suitable interface controls that allow the user to define a schedule for archiving the specified data items to cloud storage (e.g. once a day, once a week, every hour, etc.).

Once the necessary historian configuration data has been set via historian configuration interface 1016, client device 1010 can then send this configuration data to the cloud platform 1002 to facilitate deployment of the cloud-based data historian system 1020. The historian configuration information can be stored in a dedicated storage area of cloud storage 1006 associated with the enterprise. Thereafter, the specified data from local historians 1018 will be archived to cloud storage 1006 in accordance with the system configuration. That is, data collection component 1008 can remotely monitor the indicated data items from cloud platform 1002 and migrate the data from the local historians 1018 to cloud storage 1006 according to the defined schedule. In some scenarios, local historians 1018 can interact with cloud platform 1002 over individual cloud gateways integrated with the respective local historians. Alternatively, local historians 1018 can provide their stored data to cloud platform 1002 over a shared cloud gateway that aggregates the selected data from the local historians and migrates the data to cloud storage under control of data collection component 1008. Thus, historian template 1012 transforms client device 1010 into a historian management tool that allows a system administrator or other user to configure and manage cloud-based data historian functionality. Historian data stored on cloud storage 1006 can be accessed by an authorized cloud-capable client device via interface component 1022. In this regard, historian configuration interface 1016 can include controls for defining user profiles and associated access privilege for respective users.

In one or more embodiments, the template library can include various industry-specific historian templates. Each industry-specific template can include historian interface features that are customized for a particular type of industry (e.g., automotive, food and drug, power generation, oil and gas, life sciences, etc.). For example, a given industry may be known to use common system structures or common types of equipment across most facilities. Accordingly, a historian template specific to that industry may include interface features for building data model 1004, where the hierarchical levels or equipment types available to be selected for inclusion in the data model include those that are commonly found in that industry.

Figure 13:
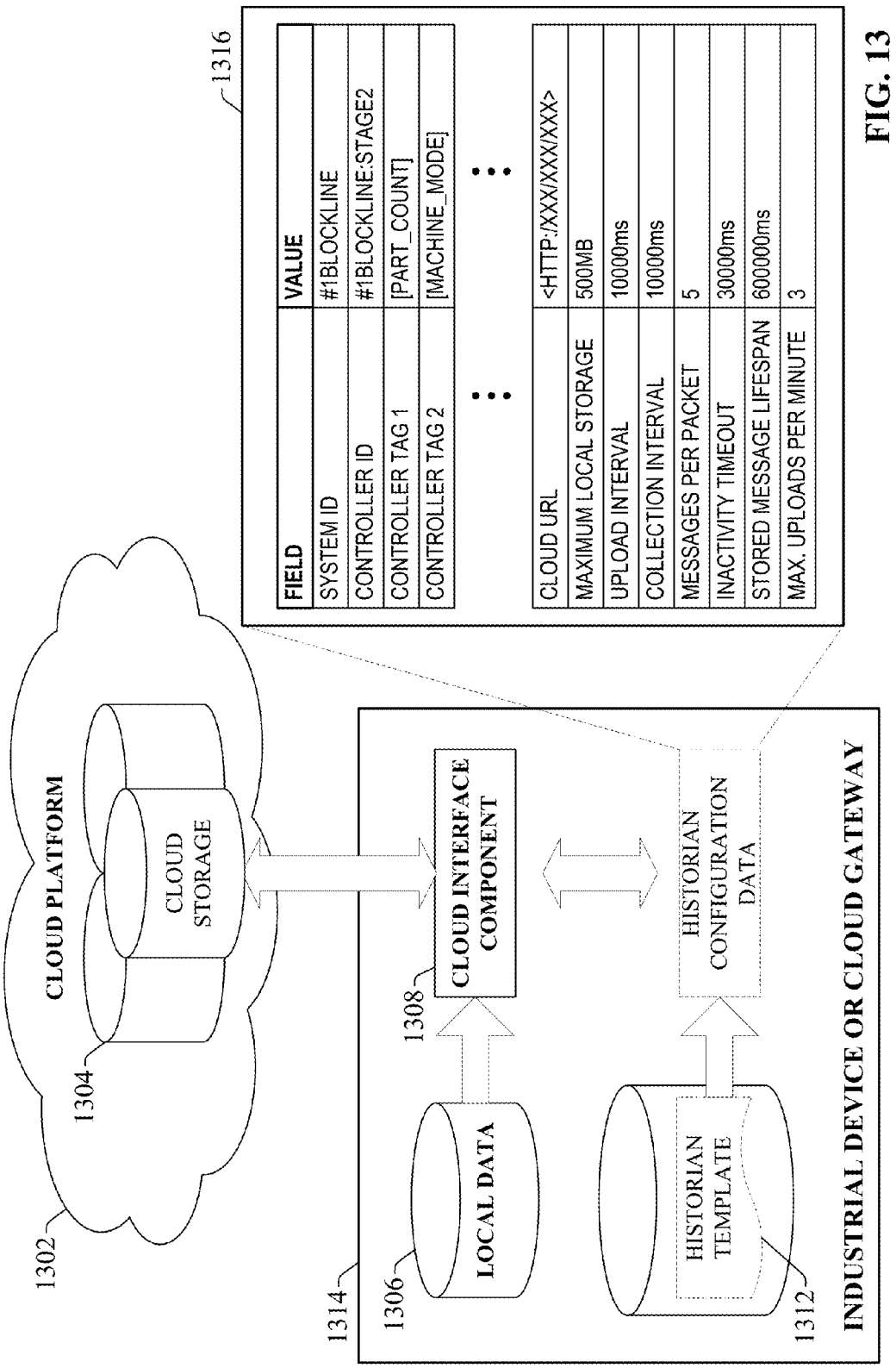
FIG. 13 illustrates configuration of an industrial device or cloud gateway device to interact with a cloud-based historian system using a historian template.

FIG. 13 illustrates another type of historian template that can be installed on an industrial device or network infrastructure device to facilitate pushing of industrial data to cloud storage. In the present example, historian template 1312 can be installed on an industrial device such as an industrial controller, a local data historian, a meter or other telemetry device, an operator interface terminal, or other such device. Alternatively, historian template 1312 can be installed on a stand-alone cloud gateway device (e.g., cloud gateways 106 of FIG. 1) that is networked to one or more industrial devices from which historian data is to be collected for archival storage. The cloud gateway device can be configured as an intermediate device that aggregates data from multiple industrial devices and provides the aggregated data to cloud platform 1302 for storage on cloud storage 1304.

Once installed, historian template 1312 can be used to configure the industrial device or cloud gateway device to access a cloud platform 1302 and provide a selected subset of data to cloud storage 1304 for archival storage. To this end, historian template 1312 can serve an interface to a client device connected to industrial device or cloud gateway 1314 that allows a user to set values for a number of configuration data fields 1316.

Based on the values of configuration data fields 1316, the industrial device or cloud gateway 1314 can determine which subset of available data is to be provided to cloud platform 1302, an identification of the cloud platform to which the data is to be sent, a frequency of upload, and other such parameters. The exemplary configuration data fields 1316 illustrated in FIG. 13 include fields for the System ID, the Controller ID, one or more controller tags, a cloud URL (uniform resource locator), and a maximum local storage, where the values of the respective fields can be set by the user. It is to be appreciated that the fields illustrated in FIG. 13 are only intended to be exemplary, and configuration data fields 1316 may include any suitable set of configuration fields without departing from the scope of this disclosure.

The System ID field can be an identifier of the control system for which the data is to be collected. This field can be used when the historian template 1312 is installed on a cloud gateway and needs to identify the data sources from which data is to be collected. For example, the System ID can identify a production area, a machine, an assembly line, or other system designation. In another example, the cloud gateway may be used to collect data from a mobile control and/or monitoring system residing on a truck (e.g., a system health monitoring system on a cargo or service vehicle), and the System ID can be a truck identifier. In this way, data from multiple trucks comprising a fleet can be collected using respective cloud gateways on board each truck, and the source of the data can be identified by the cloud application by each cloud gateway's System ID. The System ID field (or a separate field) can also be used to define a communication plug-in that the gateway will use (e.g., Common Industrial Protocol, Modbus, OPC DA/HAD, database, etc.)

The Controller ID field can identify an industrial controller from which the data is to be collected (e.g., a controller associated with the control system identified by the System ID field), and the Controller Tag fields can identify the particular controller tags holding the data. These can include both discrete controller tags containing digital data values as well as analog tags containing integer or real data values. In cases in which historian template is installed on an industrial controller, the Controller Tag fields can refer to local tags on the controller containing data that is to be sent to cloud platform 1302 for storage. The Cloud URL field can identify the address of the cloud platform to which the data will be sent. The maximum local storage field can be used to configure a maximum amount of local storage space that is to be used for local data storage when communication to the cloud platform has been lost.

Configuration data fields 1316 can also include communication parameters defining collection and transmission intervals, store-and-forward preferences, and other such configuration information. For, example, configuration data fields 1316 may define an upload interval, a data collection interval, a number of messages per packet, an inactivity timeout duration, a maximum number of uploads per minute, etc.

Once configured using historian template 1312, the industrial device or cloud gateway can interface with cloud platform 1302 via a generic Internet layer and provide the data from the specified controller tags to cloud storage 1304 in accordance with the defined communication parameters. In the case of industrial devices such as industrial controllers (wherein the controller tag fields refer to local controller tags) the data can be retrieved from local storage 1306 on the device and pushed to the cloud platform 1302. If the historian template 1312 is installed on a cloud gateway device, the gateway will retrieve the data from the specified data tags on the industrial device(s) networked to the gateway device, and push the data to cloud storage 1304.

Like historian template 1012 illustrated in FIG. 9, historian template 1312 can be an industry-specific or device-specific template. For example, historian template 1312 can be a device-specific template designed to be compatible with the particular hardware, software, or firmware of industrial device 1314, such that historian template 1312 is capable of transforming industrial device 1314 into a cloud-capable device configured to exchange data with cloud platform 1302.

Figure 14:
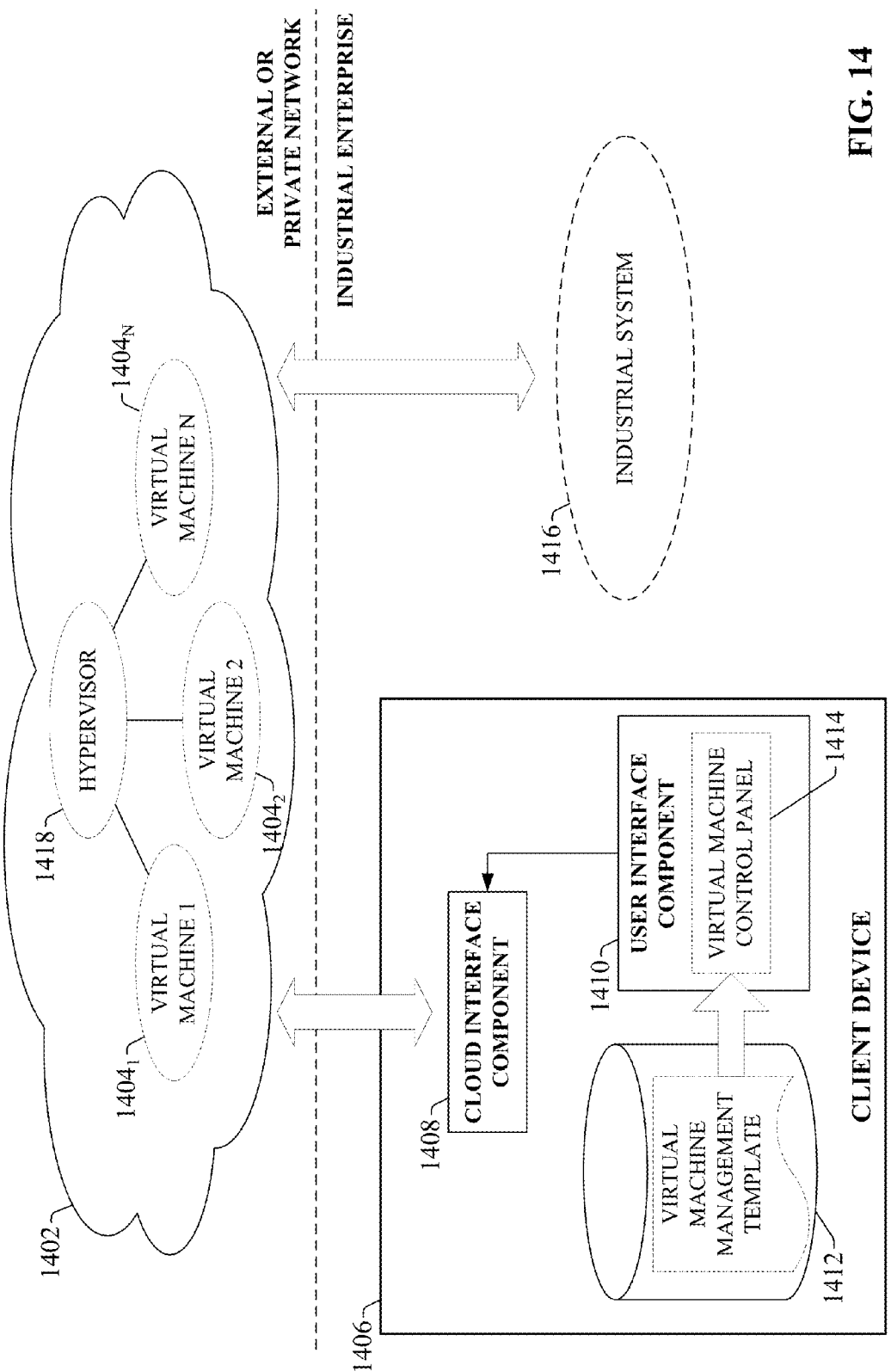
FIG. 14 illustrates deployment of cloud-based virtual machines using a virtual machine management template.

FIG. 14 illustrates an exemplary cloud-based industrial system that utilizes a virtual machine management template. Similar to the exemplary templates described above, the virtual machine management template 1412 can be retrieved from the cloud template provisioning system (or installed from a portable computer-readable storage medium) and installed on client device 1406. In one or more embodiments, execution of the virtual machine management template 1412 on client device 1406 causes a user interface component 1410 of client device 1406 to render a virtual machine control panel 1414 that can be used to deploy and manage virtual machines 1404 on cloud platform 1402.

Virtual machines $1404_{1-N}$ can comprise, for example, virtualized hardware and software systems that execute using respective cloud resource allocations. In some exemplary systems, virtual machines $1404_{1-N}$ can be used to execute applications in connection with monitoring and/or control of an industrial system 1416. For example, one or more of virtual machines $1404_{1-N}$ can execute control algorithms that monitor and control portions of industrial system 1416 remotely from cloud platform 1402. For example, an exemplary virtual machine can run a control algorithm that receives data from one or more industrial devices comprising the industrial system 1416 (e.g., from one or more cloud gateways that gather the data from industrial devices and provide the data to the cloud platform 1402, such as cloud gateways 106 of FIG. 1). Virtual machines $1404_{1-N}$ may also execute data collection applications, reporting applications, remote operator interface applications, automated notification applications, or other such systems. In some systems, a cloud-based hypervisor 1418 can manage cloud processing and storage resource utilization for each of the virtual machines $1404_{1-N}$. That is, the hypervisor 1418 dynamically allocates cloud processing and storage resources to each of the virtual machines $1404_{1-N}$ as the virtual machines perform their respective tasks.

Virtual machine management template 1412 can facilitate creation, management, and deletion of virtual machines on cloud platform 1402. As in previous examples, virtual machine management template 1412 can be acquired via the cloud template provisioning system described above. When installed and executed on a client device 1406 (or accessed remotely by client device 1406, as in FIG. 8), virtual machine management template 1412 can generate a virtual machine control panel 1414 on a user interface component 1410 of client device 1406. Virtual machine control panel 1414 can include intuitive interface controls that allow a user to create, start, stop, or delete virtual machines on cloud platform 1402 directly from the control panel. These can include, for example, controls for selecting a type of virtual machine to be deployed, naming the virtual machine, specifying a hostname of a cloud-based host on which the virtual machine is to run, specifying a cloud-based hypervisor that is to perform resource management for the virtual machine, and defining a resource allocation for the virtual machine. Virtual machine control panel 1414 can also configure user access privileges for the new virtual machine. Once configured via virtual machine control panel, the new virtual machine can be deployed and run on cloud platform 1402. Configuration data received via virtual machine control panel 1414 can be submitted to cloud platform 1402 via a cloud interface component 1408 on client device 1406 (e.g., a network interface that communicatively couples the client device 1406 to the cloud platform 1402 via the Internet).

After deployment, the virtual machines $1404_{1-N}$ can be monitored and administered via virtual machine control panel 1414. For example, virtual machine control panel 1414 can monitor and display current resource utilization for each of the virtual machines $1404_{1-N}$. Virtual machines can also be started, stopped, and deleted via virtual machine control panel 1414.

The template library described above can include multiple industry-specific virtual machine management templates suitable for various industry types (e.g., automotive, power generation, food and drug, coal and gas, mining, etc.). A given industry-specific virtual machine management template can include virtual machine deployment tools that facilitate creation and deployment of virtual machines and associated cloud-based applications that may be of particular utility for the given industry.

The cloud template library can include a number of other types of cloud templates in addition to those described above. For example, once a cloud-based system has been configured and deployed, a dashboard template can be used to display an overview of the cloud-based system. When installed and executed on a client device, the dashboard template can render a graphical interface that affords a live view of a number of cloud system metrics. In some embodiments, the dashboard template can display a current cloud resource utilization for each virtual machine running on the cloud platform, an amount of cloud storage being used by a cloud-based data historian application, or other such metrics. The dashboard template can be configured to provide an administrative view (e.g., a broad overview of the entire cloud-based system) or a personalized view for non-administrative users that displays only selected subsets of the cloud system.

Other exemplary cloud templates can include a process control template that facilitates configuration of a cloud based process control system; a device hierarchy template that can be used to define an enterprise and/or device hierarchy (e.g., data model 1004) that can be leveraged by one or more cloud-based industrial systems in connection with data location, retrieval, and storage; and a services template that can be used to set up unique industrial automation services on the cloud.

FIGS. 15-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 15:
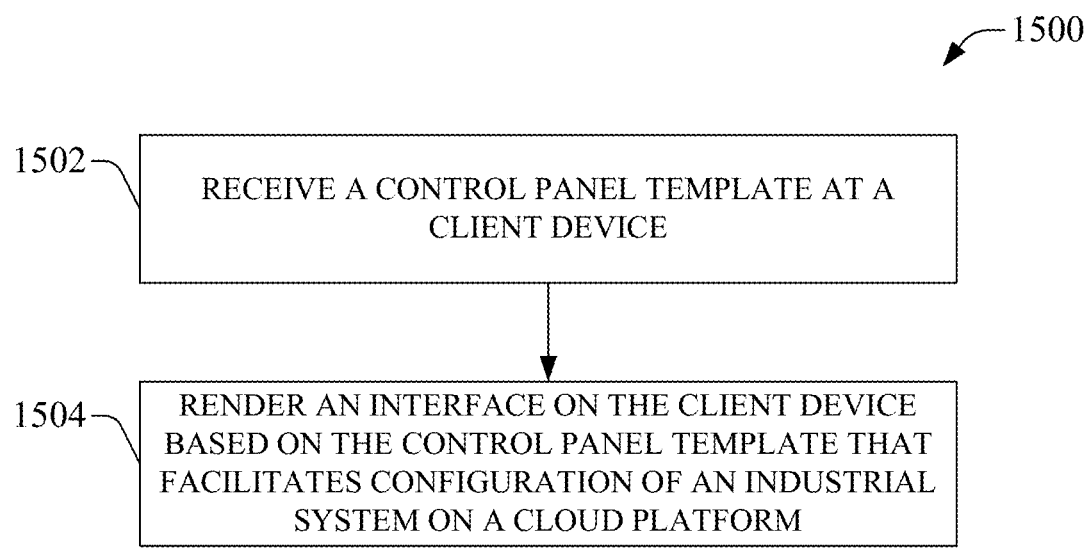
FIG. 15 is a flowchart of an example methodology for utilizing a control panel template to configure a cloud-based industrial system.

FIG. 15 illustrates an example methodology 1500 for utilizing a control panel template to configure a cloud-based industrial system. Initially at 1502, a control panel template is received at a client device. The control panel template can be acquired, for example, from a cloud template provisioning system that runs on web-server or cloud platform. Alternatively, the control panel template can be installed on the client device from a portable computer-readable storage medium. At 1504, an interface is rendered on the client device based on the control panel template, wherein the interface facilitates configuration of an industrial system on a cloud platform. For example, the interface can allow a user, through the client device, to configure user profiles and associated access privileges, define industrial devices to be integrated into the cloud-based system, define billing structures for users of the cloud-based system, or other such administrative tasks.

Figure 16:
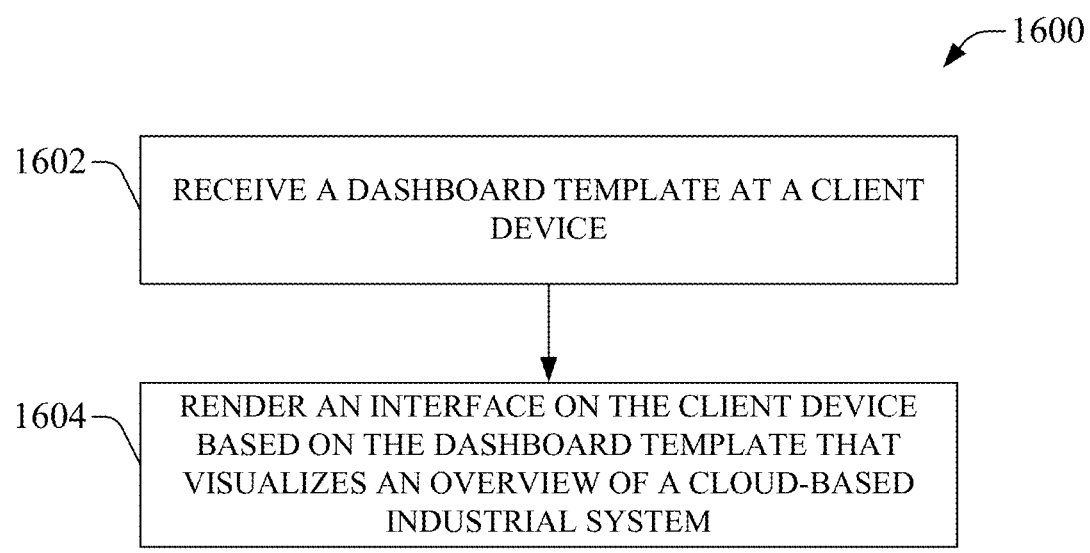
FIG. 16 is a flowchart of an example methodology for utilizing a dashboard template to monitor one or more aspects of a cloud-based system.

FIG. 16 illustrates an example methodology 1600 for utilizing a dashboard template to monitor one or more aspects of a cloud-based system. Initially at 1602, a dashboard template is received at a client device (e.g., from a cloud template provisioning system or from a portable computer-readable medium). At 1604, an interface is rendered on the client device based on the dashboard template that visualizes an overview of a cloud-based industrial system. For example, the interface can display a current cloud resource utilization for a virtual machine running on the cloud platform, an amount of cloud storage being consumed by a cloud-based data historian application, a status of an industrial device or machine on a plant floor based on data received at the cloud from an automation system, or other such aspects.

Figure 17:
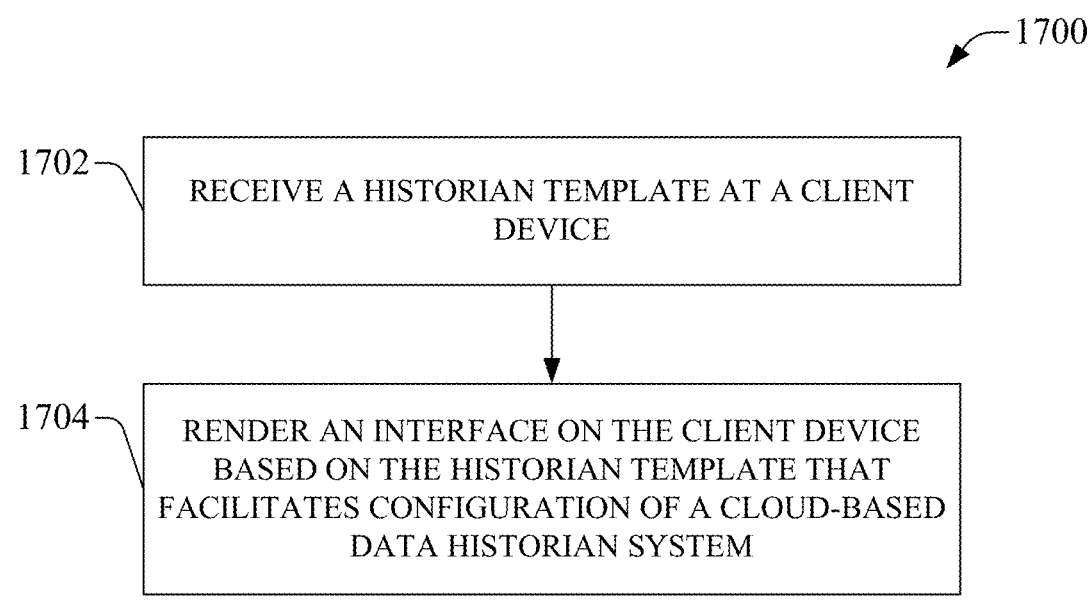
FIG. 17 is a flowchart of an example methodology for utilizing a historian template to configure a cloud-based data historian system.

FIG. 17 is an example methodology 1700 for utilizing a historian template to configure a cloud-based data historian system. Initially at 1702, a historian template is received at a client device. At 1704, an interface is rendered on the client device based on the historian template that facilitates configuration of a cloud-based data historian system. For example, the interface can allow a user to define a device from which data is to be collected (e.g., a controller, a plant floor data historian, a business server, etc.), one or more data tags from which the data is to be collected, a frequency of data migration, or other such aspects. The configuration data received via the interface can be sent to a cloud platform allocated to an industrial enterprise to facilitate configuration of the data collection functions at the cloud platform.

Figure 18:
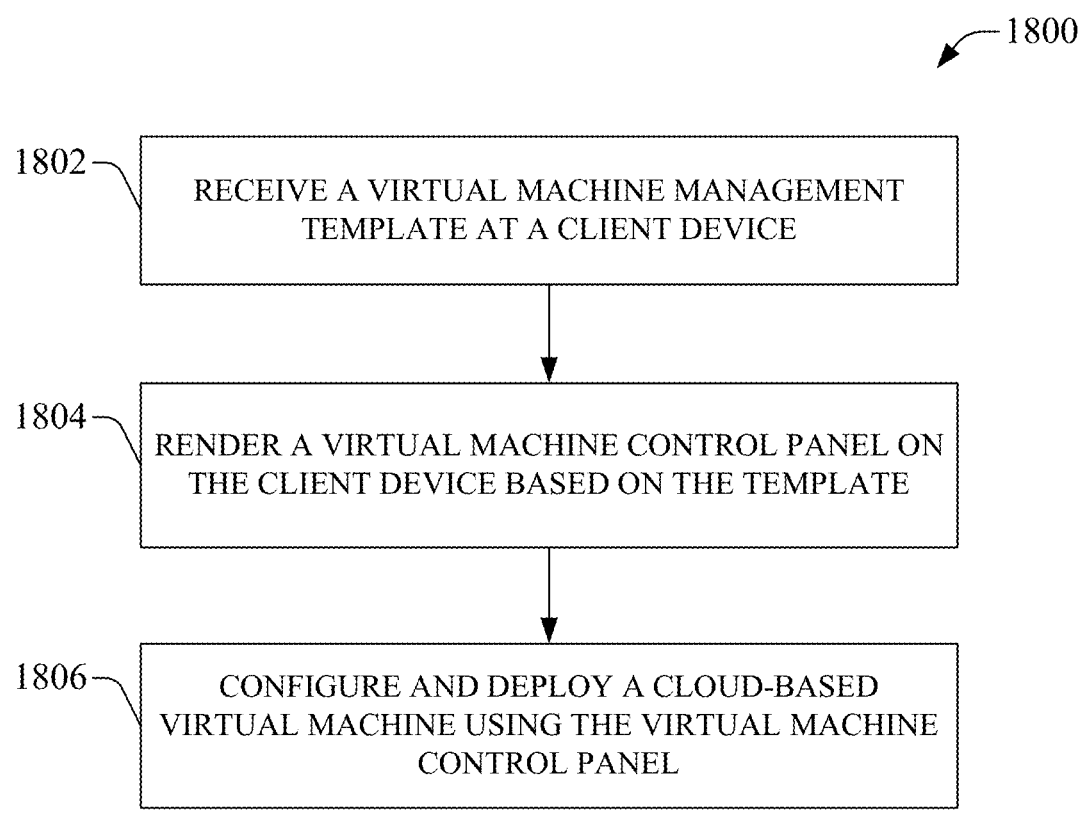
FIG. 18 utilizing a virtual machine management template to configure and deploy virtual machines on a cloud platform.

FIG. 18 is an example methodology 1800 for utilizing a virtual machine management template to configure and deploy virtual machines on a cloud platform. Initially at 1802, a virtual machine management template is received at a client device. At 1804, a virtual machine control panel is rendered on the client device based on the virtual machine management template. At 1806, a cloud-based virtual machine is configured and deployed from the client device using the virtual machine control panel.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
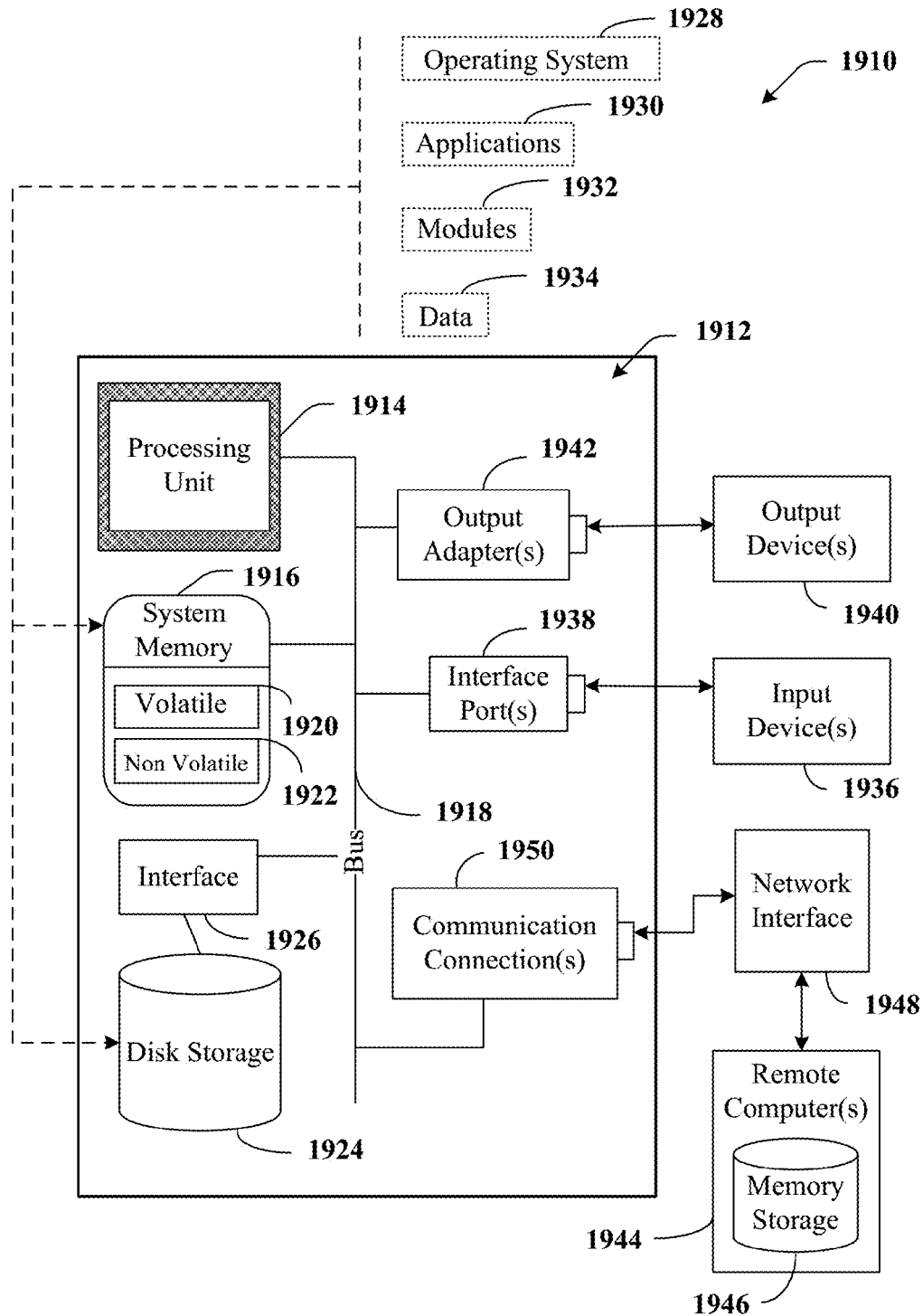
FIG. 19 is an example computing environment.
Figure 20:
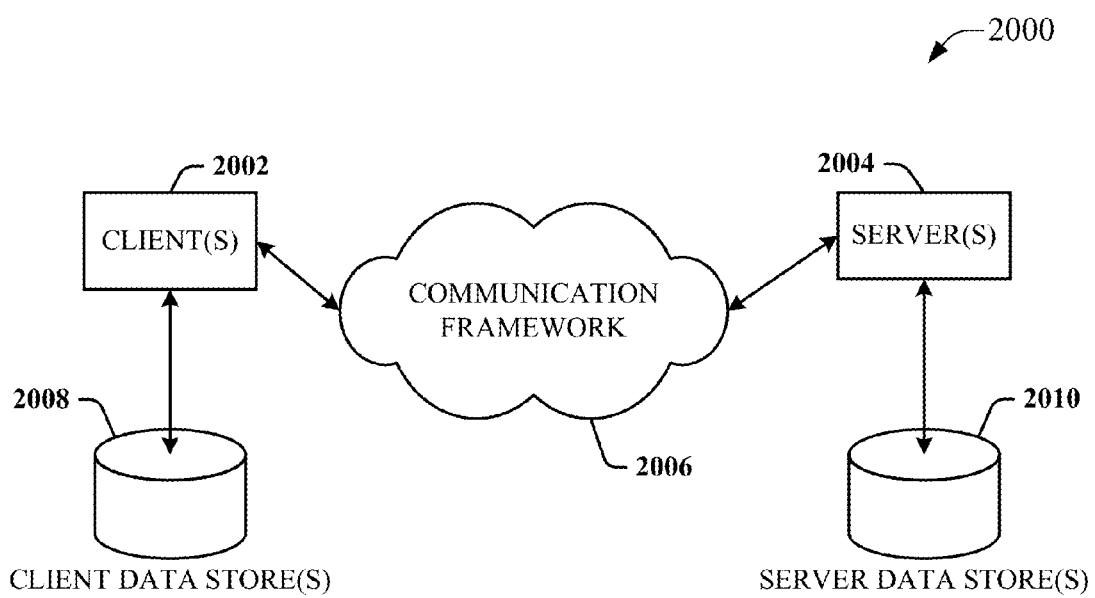
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and a server 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system for provisioning cloud templates, comprising:
a memory that stores cloud dashboard templates in a template library, wherein the cloud dashboard templates are categorized in the template library according to industry types and industrial control project types;
a processor that executes computer-executable components stored in the memory to implement the system, the computer-executable components comprising:
a search component configured to receive first query input specifying an industry type, of the industry types, and second query input specifying an industrial control project type, of the industrial control project types, and to select a subset of the cloud dashboard templates corresponding to the industry type and the industrial control project type;
an interface component configured to display information identifying the subset of the cloud dashboard templates; and
a retrieval component configured to send a selected cloud dashboard template of the subset of the cloud dashboard templates to a client device,
wherein the selected cloud dashboard template is configured to display, on the client device, system data generated by a cloud-based industrial system that pertains to the industry type and the industrial control project type.

2. The system of claim 1, wherein the search component is further configured to receive third query input specifying a vendor, and to filter the subset of the cloud dashboard templates according to the vendor.

3. The system of claim 1, wherein the search component is further configured to receive third query input specifying a type of industrial device, and to filter the subset of the cloud dashboard templates according to the type of industrial device.

4. The system of claim 1, wherein the system data comprises at least an indication of an amount of cloud resources utilized by the cloud-based industrial system.

5. The system of claim 1, wherein the system data comprises at least status information for one or more industrial devices operating on a plant floor, and wherein the status information is based on device data generated by the one or more industrial devices and stored on the cloud platform.

6. The system of claim 1, wherein the cloud dashboard template is further configured to receive configuration data from the client device and to send a configuration instruction, based on the configuration data, to the cloud platform, and wherein the configuration data facilitates configuration of a portion of the cloud-based industrial system.

7. The system of claim 1, wherein the industry types comprise at least one of an automotive industry, a pharmaceutical industry, a waste water treatment industry, a food and drug industry, an oil industry, a coal industry, a gas industry, a power generation industry, a life sciences industry, or a mining industry.

8. The system of claim 1, wherein the template library resides on at least one of a cloud platform or a web server.

9. The system of claim 1, further comprising a publishing component configured to receive a cloud template submission comprising a new cloud dashboard template and metadata indicating one of the industry types and one of the industrial control project types, and to catalog the new cloud dashboard template in the template library according to the one of the industry types and the one of the industrial control project types.

10. A method for provisioning cloud templates, comprising:
storing cloud dashboard templates in a template library, wherein the storing comprises categorizing the cloud dashboard templates according to industry types and industrial control project types;
receiving, by a cloud template provisioning system that includes a processor, first query input from a client device specifying an industry type of the industry types;
receiving, by the cloud template provisioning system, second query input from the client device specifying an industrial control project type of the industrial control project types;
selecting a subset of the cloud dashboard templates that correspond to the industry type and the industrial control project type;
rendering, on the client device, identification information for the subset of cloud dashboard templates;
in response to receiving selection data from the client device indicating a selected cloud dashboard template of the subset of cloud dashboard templates, delivering the selected cloud dashboard template to a memory location associated with the client device; and
displaying, on the client device via the cloud template, system data generated by a cloud-based industrial system that pertains to the industry type and the industrial control project type.

11. The method of claim 10, further comprising:
receiving, by the cloud template provisioning system, third query input from the client device specifying a vendor; and filtering the subset of the cloud dashboard templates according to the vendor.

12. The method of claim 10, further comprising:
receiving, by the cloud template provisioning system, third query input from the client device specifying an industrial device type; and
filtering, by the cloud template provisioning system, the subset of the cloud dashboard templates according to the industrial device type.

13. The method of claim 10, wherein the displaying comprises at least displaying an indication of an amount of cloud resources being utilized by the cloud-based industrial system.

14. The method of claim 10, wherein the displaying comprises at least displaying status information for one or more industrial devices operating on a plant floor, wherein the status information is based on data generated by the one or more industrial devices and stored on the cloud platform.

15. The method of claim 10, further comprising:
receiving, by the cloud template provisioning system, configuration data from the client device; and
sending, by the cloud template provisioning system, a configuration instruction to the cloud platform based on the configuration data, wherein the configuration instruction facilitates configuration of a portion of the cloud-based industrial system.

16. The method of claim 10, wherein the receiving the first query input comprises receiving a selection of at least one of an automotive industry, a pharmaceutical industry, a waste water treatment industry, a food and drug industry, an oil industry, a coal industry, a gas industry, a power generation industry, a life sciences industry, or a mining industry.

17. The method of claim 10, further comprising:
receiving a cloud template submission comprising a new cloud dashboard template and metadata indicating one of the industry types and one of the industrial control project types, and
storing the new cloud dashboard template in the template library, wherein the storing comprises cataloging the new cloud dashboard template according to the one of the industry types and the one of the industrial control project types.

18. A computer-readable medium having stored thereon computer-executable instructions that, in response to execution, cause a computing system to perform operations, the operations comprising:
categorizing a set of cloud dashboard templates in a template library according to industry types and industrial control project types;
receiving first query input from a client device identifying an industry type of the industry types;
receiving second query input from the client device identifying an industrial control project type of the industrial control project types;
identifying a subset of the cloud dashboard templates that correspond to the industry type and the industrial control project type;
displaying, on the client device, identification information for the subset of cloud dashboard templates;
in response to receiving selection data from the client device identifying a selected cloud dashboard template of the subset of cloud dashboard templates, delivering the selected cloud dashboard template to a memory location associated with the client device; and
displaying, on the client device via the cloud template, system data generated by a cloud-based industrial system that relates to the industry type and the industrial control project type.

19. The computer-readable medium of claim 18, the operations further comprising:
receiving third query input identifying a type of industrial device; and
filtering the subset of the cloud dashboard templates according to the type of industrial device.

20. The computer-readable medium of claim 18, wherein the system data comprises at least status information for one or more industrial machines operating on a plant floor, and wherein the status information is based on operational data stored on the cloud platform.

* * * * *